(12) United States Patent
Kurabayashi

(10) Patent No.: US 10,904,499 B2
(45) Date of Patent: Jan. 26, 2021

(54) INFORMATION PROCESSING SYSTEM, INFORMATION PROCESSING DEVICE AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/451,181

(22) Filed: Jun. 25, 2019

(65) Prior Publication Data

US 2019/0313068 A1 Oct. 10, 2019

Related U.S. Application Data

(63) Continuation of application No. PCT/JP2017/040157, filed on Nov. 7, 2017.

(30) Foreign Application Priority Data

Dec. 26, 2016 (JP) .................................. 2016-251688

(51) Int. Cl.
| | |
|---|---|
| *H04N 21/44* | (2011.01) |
| *H04N 21/442* | (2011.01) |
| *H04N 21/24* | (2011.01) |
| *H04N 9/31* | (2006.01) |

(Continued)

(52) U.S. Cl.
CPC ........... *H04N 9/3182* (2013.01); *G06F 16/00* (2019.01); *H04H 60/40* (2013.01); *H04H 60/73* (2013.01);

(Continued)

(58) Field of Classification Search
CPC ......... H04N 21/2407; H04N 21/44008; H04N 21/44204; H04H 20/14
See application file for complete search history.

(56) References Cited

U.S. PATENT DOCUMENTS 5,930,385 A * 7/1999 Fujimoto ............... H04N 1/465
358/518
6,400,890 B1 6/2002 Nagasaka et al.
(Continued)

FOREIGN PATENT DOCUMENTS

JP H10-320400 A 12/1998
JP 2005-215922 A 8/2005
(Continued)

OTHER PUBLICATIONS

International Search Report issued in Application No. PCT/JP2017/040157, dated Feb. 13, 2018 (4 pages).

(Continued)

*Primary Examiner* — Robert J Hance
(74) *Attorney, Agent, or Firm* — Osha Bergman Watanabe & Burton LLP

(57) ABSTRACT

A reference-color-list generating unit of a server generates a reference color list on the basis of reference color lists stored in a CLDB, at a timing reported from a program-information management unit. An S-metadata generating unit generates S metadata from TV program information stored in an RVDB and the reference color list. A C-metadata generating unit of a user terminal generates C metadata from individual information of each frame constituting a captured image and the reference color list. An authenticity determining unit determines whether to permit or deny check-in by a user on the basis of the obtained C metadata, the S metadata extracted by the CMDB, and program detail information managed by the program-information management unit.

12 Claims, 10 Drawing Sheets

(51) Int. Cl.
- *H04H 60/40* (2008.01)
- *H04H 60/73* (2008.01)
- *H04N 21/84* (2011.01)
- *G06F 16/00* (2019.01)
- *H04N 21/234* (2011.01)
- *H04N 21/437* (2011.01)
- *H04N 21/239* (2011.01)

(52) U.S. Cl.
CPC ......... *H04N 21/234* (2013.01); *H04N 21/239* (2013.01); *H04N 21/2407* (2013.01); *H04N 21/437* (2013.01); *H04N 21/44* (2013.01); *H04N 21/44008* (2013.01); *H04N 21/44204* (2013.01); *H04N 21/84* (2013.01)

(56) References Cited

U.S. PATENT DOCUMENTS

| | | | | |
|---|---|---|---|---|
| 2002/0146166 | A1* | 10/2002 | Rao | G06K 9/342 |
| | | | | 382/164 |
| 2003/0031361 | A1* | 2/2003 | Said | H04N 1/642 |
| | | | | 382/166 |
| 2007/0052802 | A1 | 3/2007 | Kasutani et al. | |
| 2008/0279481 | A1 | 11/2008 | Ando | |
| 2016/0360207 | A1* | 12/2016 | Lin | H04N 19/96 |

FOREIGN PATENT DOCUMENTS

| | | | | |
|---|---|---|---|---|
| JP | 2007-49584 A | 2/2007 | | |
| JP | 2011-77607 A | 4/2011 | | |
| JP | 2014-123839 A | 7/2014 | | |
| WO | 2005/011294 A1 | 2/2005 | | |
| WO | WO-2013179654 A1 * | 12/2013 | ............. | H04L 67/06 |
| WO | WO-2015045209 A1 * | 4/2015 | ......... | G06Q 30/0207 |

OTHER PUBLICATIONS

Written Opinion issued in International Publication No. PCT/JP2017/040157, dated Feb. 13, 2018 (3 pages).

\* cited by examiner

FIG. 4

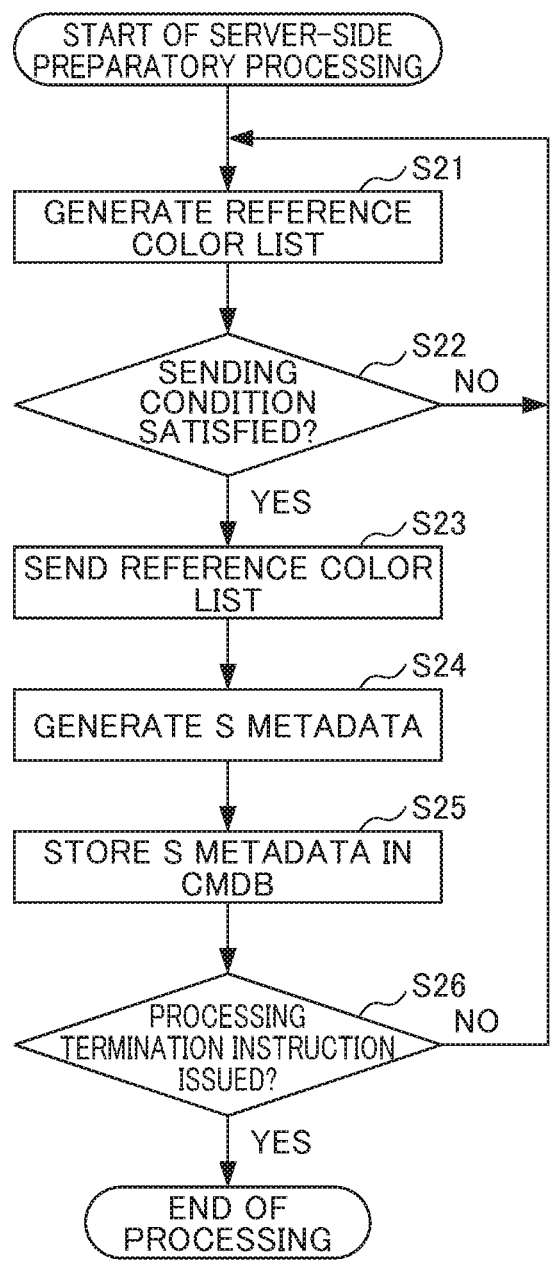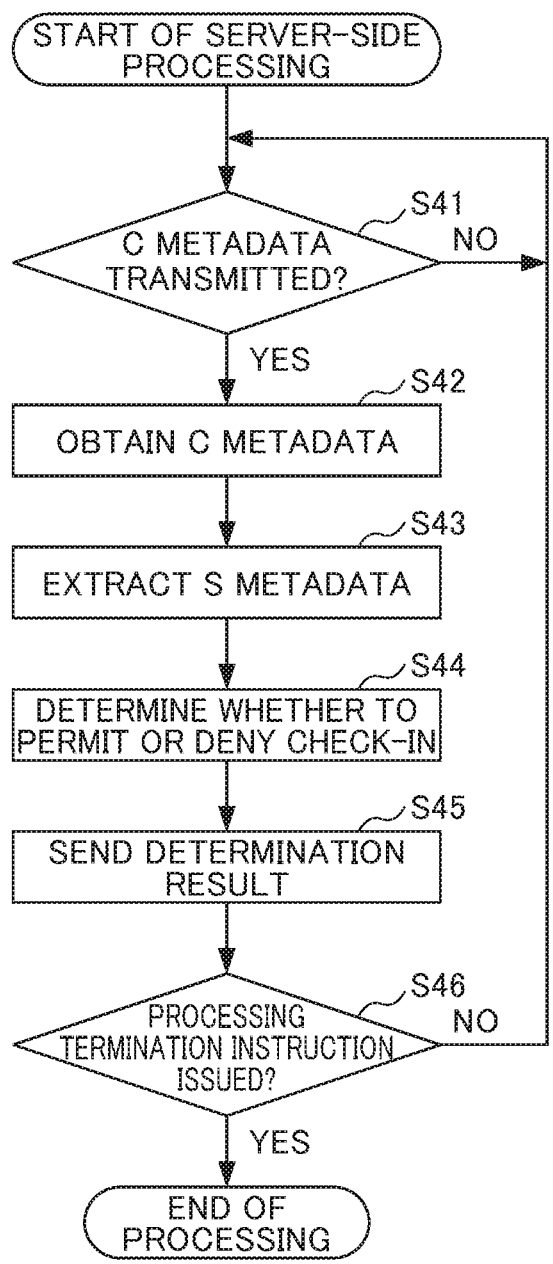

INFORMATION PROCESSING SYSTEM, INFORMATION PROCESSING DEVICE AND PROGRAM

TECHNICAL FIELD

The present invention relates to information processing systems, information processing devices, and programs.

BACKGROUND ART

Recently, it is widely and commonly practiced to provide a service in accordance with the viewing status of certain television broadcasts or the like by coordinating television broadcasts with an application on a smartphone or the like.

In providing such a service, a technology for confirming that a viewer is viewing a specific television program by way of a "check-in" operation using a camera of a smartphone or the like is extremely useful.

Conventionally, it has been the case to perform check-in by using a two-dimensional barcode or an acoustic wave outside the audible range. With these technologies, however, it is necessary to display a code or the like that is not directly related to the content on the screen, or a special speaker is required. Thus, direct application of these technologies to television broadcasting has not been possible.

One technology that can be applied to television broadcasting in this respect is a technology in which feature quantities are extracted from a video stored in advance in a system and in which a comparison for check-in is performed on the basis of the feature quantities (e.g., see Patent Literature 1). There is also a technology in which information of an image obtained by capturing a television video by using a mobile phone is directly sent to a server and in which a comparison for check-in is performed by using the image information (e.g., see Patent Literature 2).

Japanese Unexamined Patent Application, Publication No. Hei 10-320400

Japanese Unexamined Patent Application, Publication No. 2005-215922

DISCLOSURE OF THE INVENTION

Problems to be Solved by the Invention

However, for example, with the technology of Patent Literature 1 described above, since it is possible to use feature quantities prepared in advance by a user as a query, there has been a problem of vulnerability to illegitimate acts (what are called cheating acts).

Meanwhile, with the technology of Patent Literature 2 described above, since photographed image information itself is sent to the server side and comparison is performed on the server side, although the technology is applicable even with untrusted input, there has been a problem in that it is difficult to allow simultaneous check-in by a large number of viewers (i.e., the scalability is low) because image information itself is sent to the server side.

As described above, many problems have been involved in technologies for check-in to television broadcasts by using a smartphone or the like.

In order to overcome such problems with existing technologies, there has been a demand for developing a check-in technology that makes it possible to realize the following three features: namely, scalability that allows simultaneous check-in by a large number of viewers, the ability to deal with the diversity of the types of television receivers and smartphones, and prevention of illegitimate check-in by using a fake television video The present invention has been made in view of the situation described above, and it is an object thereof to provide a technology that makes it possible to confirm, with high accuracy and at high speed, that a large number of unspecified viewers are viewing a certain video by way of "check-in" operations using cameras.

Means for Solving the Problems

In order to achieve the above object, an information processing system according to one aspect of the present invention is:

an information processing system constituted of clients and a server, wherein the clients each include:

a video obtaining means that obtains video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;

a reference-color-list obtaining means that obtains a reference color list represented by a sequence of N (N is an integer greater than or equal to 2) reference colors on the basis of transmitted information transmitted from the server during a certain period during broadcasting or before the start of broadcasting of the content;

a client-side metadata generating means that sets each of M (M is an integer greater than or equal to 2) unit images constituting the client-side video as a processing target, that classifies each pixel or each block in the processing target into one of the N reference colors on the basis of the reference color list, that generates information representing a distribution of the N reference colors for the processing target, and that generates information representing the individual distributions for the M unit images as metadata of the client-side video; and a metadata sending control means that executes control to send the metadata of the client-side video to the server, and wherein the server includes:

a reference-color-list-or-the-like generating means that generates, as the transmitted information, the reference color list itself, in which at least either the kinds or sequence of the reference colors vary among the individual clients or among individual groups to which the clients belong, or information needed for creating the reference color list, before broadcasting or during broadcasting of the content;

a reference-color-list-or-the-like sending control means that executes control to send the transmitted information for the individual clients or for the individual groups to the clients during a certain period during broadcasting or before the start of broadcasting of the content;

a server-side metadata generating means that sets each of the plurality of unit images constituting the video in the content as a processing target, that classifies each pixel or each block in the processing target into one of the N reference colors on the basis of the reference color lists for the individual clients or for the individual groups, that generates information representing a distribution of the N reference colors for the processing target, and that generates information representing the individual distributions for the plurality of unit images as server-side metadata; and a determining means that compares the metadata of the client-side video with metadata for the M unit images in the server-side metadata and that determines the authenticity of the client-side video on the basis of the result of the comparison.

An information processing method and a program according to one aspect of the present invention are also provided as a method and a program corresponding to the information processing system according to the aspect of the present invention.

Effects of the Invention

The present invention makes it possible to provide a technology that makes it possible to confirm with high accuracy and at high speed that a large number of unspecified viewers are viewing a certain video by way of "check-in" operations using cameras.

BRIEF DESCRIPTION OF DRAWINGS

FIG. 4 is an illustration showing an example of reference colors for creating a reference color list according to the embodiment of the present invention.

FIGS. 9A and 9B are a flowchart for explaining the flows of authenticity-determination preparatory processing and authenticity determination processing that are executed by the server in FIG. 6.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images."

Furthermore, "moving images" should be construed to include images that are displayed individually through the following first processing to third processing.

First processing refers to processing for displaying a series of a plurality of still images, while continuously switching among them as time passes, for individual actions of objects (e.g., animation characters) in planar images (2D images). Specifically, two-dimensional animation, i.e., processing similar to what is called book flipping, is an example of first processing.

Second processing refers to processing for presetting motions corresponding to individual actions of objects (e.g., animation characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., animation characters) and rendering the videos as time passes.

Here, a "video (i.e., moving image)" is constituted of images of a plurality of frames, fields, or the like (hereinafter referred to as "unit images"). In the example described below, it is assumed that the unit images are frames.

Furthermore, in the embodiment described below, videos are transmitted by way of television broadcasting, and "television" will hereinafter be abbreviated as "TV".

In order to realize check-in (confirmation of authenticity) using a TV video photographed in real time, the present invention realizes a distributed architecture in which processing for analyzing a video, such as a TV program, is executed on a user terminal.

An overview of an information processing system according to an embodiment of the present invention will be described with reference to FIG. 1.

The information processing system realizes "check-in" for confirming in real time that a user is viewing TV broadcasting or the like on air.

Here, "check-in" refers to checking whether or not a certain user has undergone a specific action or procedure.

In particular, "check-in" in this embodiment refers to a technology for checking in real time whether or not a certain user is viewing a specific TV program or the like.

Specifically, the information processing system shown in FIG. 1 can realize the following three features: scalability that allows simultaneous check-in by a large number of viewers, the ability to deal with the diversity of the types of TV sets, smartphones, etc., and prevention of illegitimate check-in by using fake data for validation of authenticity (metadata described later).

Figure 1:
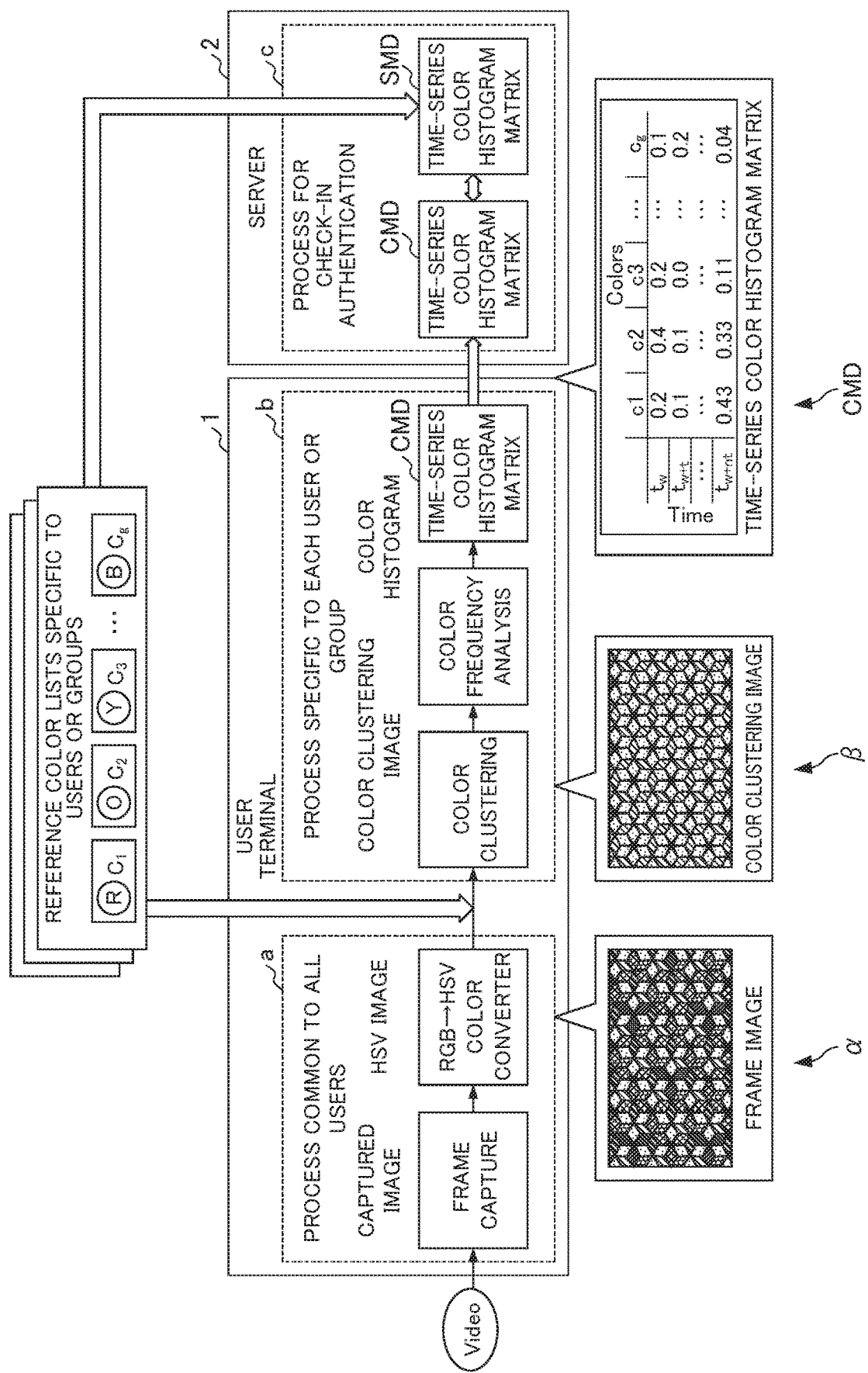
FIG. 1 is a block diagram showing an overview of an information processing system according to an embodiment of the present invention.

Accordingly, the information processing system shown in FIG. 1 is useful for TV broadcasting or Internet broadcasting assuming large-scale viewing.

A service provider can utilize the result of such check-in for TV broadcasting or the like, for example, in applications to various services for games, etc. that are provided on smartphones, etc.

Next, a series of processes that are executed by the information processing system according to the embodiment of the present invention will be described with reference to FIG. 1.

The information processing system shown in FIG. 1 executes a series of processes consisting of a process a that is common to all users, a process b that is specific to each user or group, and a process c for check-in authentication.

The information processing system shown in FIG. 1 is a system including a user terminal that is used by a user and a server 2.

The user terminal 1 and the server 2 are connected to each other via a predetermined network, such as the Internet.

Note that although only one user terminal 1 is shown in FIG. 1, in practice, a large number of users exist, and a large number of user terminals 1 corresponding to the number of users exist.

Here, for example, the user terminal 1 is a smartphone that is operated by a user, and in the case where a video of a TV program or the like for check-in that is executed by the server 2 is displayed on the display screen of a TV set, the user terminal 1 photographs or otherwise captures the display face of the display screen. In this description, a video that primarily includes the portion serving as the display face of a TV set is referred to as a "TV video".

The server 2 is managed by a service provider and executes check-in as to whether or not a certain user is viewing a specific TV program or the like.

Next, the process a, which is common to all users, and the process b, which is specific to each user or group, will be described. The process a, which is common to all users, and the process b, which is specific to each user or group, constitute a video analysis process that is executed on the user terminal 1.

The process a, which is common to all users, is a process in a former processing phase, in which all users generate common information.

The process b, which is specific to each user or group, is a process in a latter processing phase, in which information (metadata described later) that is different among individual users or among individual groups to which a plurality of users belong is generated.

In the process a in the former processing phase, which is common to all users, a camera or the like included in the user terminal 1, in response to a user's operation, photographs a video of content (e.g., a TV broadcasting program) displayed on the display face of a TV set and outputs the TV video information obtained as a result.

The TV video information is information about a certain time window (e.g., representing a certain range along the temporal direction) of the video constituting content, i.e., individual information about all the frames or a plurality of frames included in a certain time window. The information about each frame is information mapped to a color space having uniformity (e.g., representing the HSV space), i.e., information including the individual elements of a color space in the form of pixel values.

Here, a color space having uniformity refers to a color space that is designed such that the distance between two points on the coordinates of that color space maximally matches the perception of color difference by the naked eye.

Generally, the RGB space, used to represent colors on the user terminal 1, is a color space not having uniformity, and the distance between two arbitrary points in the space considerably differs from the perception of color difference by the naked eye. That is, image information obtained from the camera or the like of the user terminal 1 is RGB image information, and it is necessary to convert the individual pixel values into pixel values in a color space having uniformity, such as HSV.

The conversion from RGB to HSV can be defined as in equations (1) to (3) given below.

[Eq. 1]
$$V = \max(R, G, B) \quad (1)$$

[Eq. 2]
$$S = 255 \times \frac{\max(R, G, B) - \min(R, G, B)}{\max(R, G, B)} \quad (2)$$

[Eq. 3]
$$H = \begin{cases} 60 \frac{B-G}{\max(R,G,B)-\min(R,G,B)} & R == \max(R, G, B) \\ 60\left(2 + \frac{R-B}{\max(R,G,B)-\min(R,G,B)}\right) & G == \max(R, G, B) \\ 60\left(4 + \frac{G-R}{\max(R,G,B)-\min(R,G,B)}\right) & B == \max(R, G, B) \end{cases} \quad (3)$$

This concludes the description of the process a, which is common to all users. The details of the process b, which is specific to each user or group, and the process c for check-in authentication will be described next, with reference to FIG. 1 and the subsequent figures.

Next, a method of clustering the colors of the individual pixels constituting a frame to predetermined colors, i.e., a method that is adopted in the latter processing phase described earlier (e.g., the process b shown in FIG. 1, which is specific to each user or group), will be described with reference to FIG. 2.

Here, as a prerequisite for describing clustering, a clustering color list (hereinafter referred to as a "reference color list") will be described. In this embodiment, as a sample set of colors that may serve as references for clustering (hereinafter referred to as "reference colors"), for example, about 120 kinds of color are prepared, and information representing these colors is stored in the server 2. Furthermore, a list represented by a sequence of information about N (N is an integer greater than or equal to 2) colors selected from the about 120 kinds of color is adopted as a reference color list.

Figure 2:
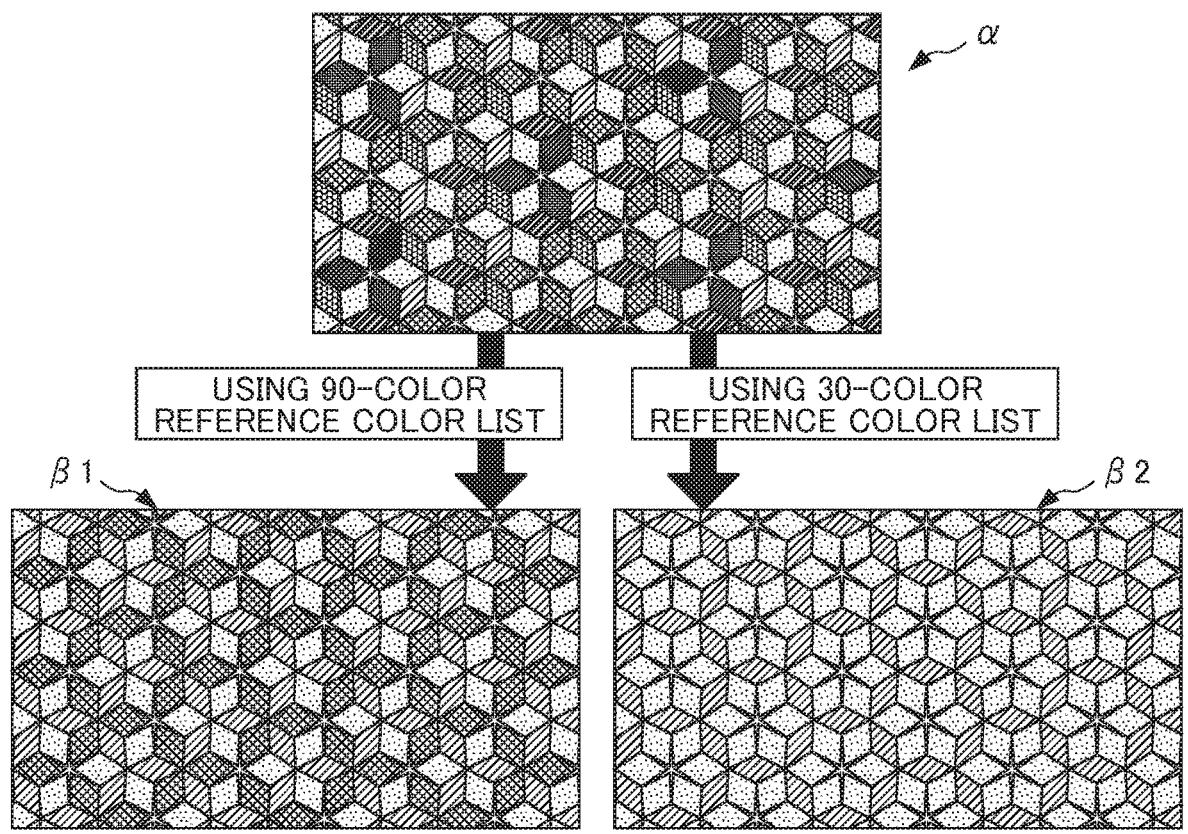
FIG. 2 is an illustration showing an example of a method of clustering to reference colors according to the embodiment of the present invention.

FIG. 2 is an illustration showing an example of a method of clustering to reference colors, which is adopted in the information processing system according to the embodiment of the present invention. An image α in FIG. 2 represents an image itself photographed by using a camera of the user terminal 1, etc.

Furthermore, an image β1 in FIG. 2 is an image obtained as a result of performing clustering by using a reference color list consisting of 90 colors among the reference colors described above. Through this clustering, each of the complex colors of the image α is classified into one of the 90 colors serving as references.

Furthermore, an image β2 in FIG. 2 is an image obtained as a result of performing clustering by using a reference color list consisting of 30 colors among the reference colors described above, which represents the original image α with only even more monotonic colors compared with the image β1 obtained as a result of clustering using 90 colors.

As described above, it is possible to cluster the complex colors of the image α, as appropriate, by using a reference color list consisting of various predetermined colors.

By performing clustering to N limited colors, such as 90 colors or 30 colors, regardless of the diversity of the types of TV receivers, smartphones, etc., an image having a high degree of similarity (the image β1 or the image β2 in FIG.

2) in comparison to the original image (the image α in FIG. 2) is reproduced. Accordingly, it is possible to deal with the diversity of the types of TV receivers, smartphones, etc.

A degree-of-color-matching computation process (e.g., the check-in authentication process c in FIG. 1) will be described with reference to FIG. 3.

Figure 3:
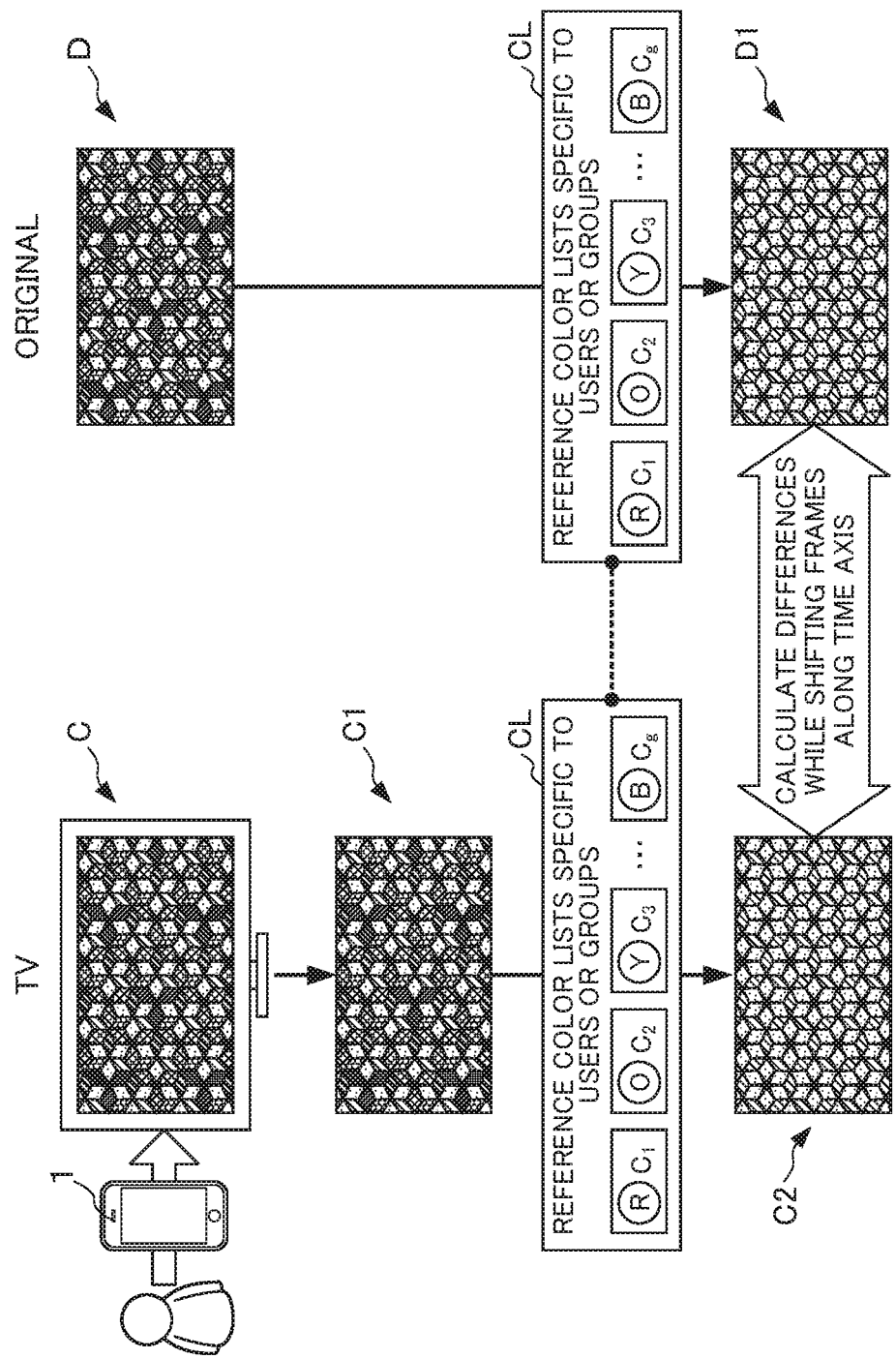
FIG. 3 is an illustration showing an example of the procedure of a degree-of-color-matching computation process according to the embodiment of the present invention.

FIG. 3 is an illustration showing an example of the procedure of a degree-of-color-matching computation process adopted in the information processing system according to the embodiment of the present invention.

Before describing the degree-of-color-matching computation process on the server 2 side, a process executed on the user terminal 1 side will be briefly described.

First, while a video C of a TV program or the like requiring check-in is being displayed on the display face of a TV set, the user terminal 1 photographs the video C to obtain information representing a photographed video C1.

The information representing the photographed video C1 is subjected to trimming in the former processing phase (e.g., the process a in FIG. 1, which is common to all users) described earlier, whereby the portion other than the display face (specifically, for example, the portion of the monitor other than the display face displaying the TV program, the background, etc.) is removed, yielding information representing a TV video C1.

Furthermore, the information representing the TV video C1 obtained as a result of trimming is subjected to clustering using a reference color list CL, whereby metadata is generated as information representing the result of analysis of the TV video C1.

Although the method of clustering is not particularly limited, here, a method of performing clustering on the basis of computation of the distance between an original image color and a reference color is adopted. For the purpose of this distance computation, although it is conceivable to use the Godlove color difference system, CIE 2000, or the like, in this embodiment, the Euclidian distance in a conical space, which was verified as being effective through evaluation experiments, is adopted.

As described above, the term "metadata" in this description refers to information that is different from video information itself, specifically, information representing the result of analysis about at least a portion (e.g., each of a predetermined number of frames) of the video.

In this embodiment, each frame in a time series constituting a video to be processed is clustered, and metadata is generated from the result of clustering of each frame. Specifically, for example, a time-series color histogram matrix M defined as in equation (4) given below is adopted as metadata.

In FIG. 3, a TV video C2 is a video that is displayed according to information obtained as a result of clustering the information representing the TV video C1. An original video D1 is a video that is displayed according to information obtained as a result of clustering information representing an original video D. The TV video C2 and the original video D1 are drawn in FIG. 3 just for convenience of explanation, and the information representing the TV video C2 and the information representing the original video D1 are not actually generated in this embodiment. That is, in this embodiment, considering the TV video C1 or the original video D as a video to be processed, a time-series color histogram matrix M defined as in equation (4) given below is generated as metadata.

[Eq. 4]

$$M := \begin{bmatrix} w_{[0,0]} & \cdots & w_{[0,m]} \\ \vdots & \ddots & \vdots \\ w_{[n,0]} & \cdots & w_{[n,m]} \end{bmatrix} \quad (4)$$

Here, n and m signify arbitrary integers greater than or equal to 1, and m corresponds to the number of kinds of color that are discriminated, i.e., the number of histogram bins, and n corresponds to the number of frames of a time series constituting the video to be processed.

In the process executed on the user terminal 1 side, the video to be processed to generate metadata is the TV video C1. Thus, clustering using the reference color list CL described earlier is executed for the information representing the TV video C1. From the result of this clustering, a time-series color histogram matrix M is generated as metadata.

The metadata generated through the process executed on the user terminal 1 side as described above will hereinafter be referred to as "C metadata".

Next, the process on the server 2 side will be described.

On the server 2 side, information representing an original video D of a TV program requiring check-in is stored. The server 2 subjects the information representing the original video D to clustering using the reference color list CL described earlier. As will be described in detail with reference to FIG. 7, the same reference color list is used as the two reference color lists CL described above.

From the result of this clustering, the server 2 generates a time-series color histogram matrix M as metadata.

The metadata generated through the process executed on the server 2 side as described above will hereinafter be referred to as "S metadata".

After such S metadata is generated, when C metadata is provided from the user terminal 1 for the purpose of check-in, the server 2 calculates the degree of similarity (difference) between the C metadata and a portion to be compared in the S metadata. The server 2 repeatedly calculates the degree of similarity (difference) while shifting the portion to be compared by sequentially shifting frames in the S metadata. The server 2 determines whether to permit or deny check-in on the basis of a plurality of degrees of similarity (differences) calculated through the repeated calculation.

Here, the portion to be compared in the S metadata refers to a portion described below. Specifically, the S metadata is a set of histograms of the individual frames of a time series constituting the entire original video of a TV program or the like requiring check-in. Meanwhile, the C metadata is a set of histograms of the individual frames of a time series constituting a portion of the TV video of the TV program or the like (the portion that was being broadcast when photographed on the user terminal 1 side). Thus, of the S metadata, a portion that can be compared with the C metadata, i.e., a set of histograms of the individual frames of a time series constituting a portion of the original video, is a portion to be compared.

Specifically, of the frames constituting the entire original video of a TV program or the like requiring check-in, considering a certain frame as a starting frame, a set of color histograms of the M (M signifies the number of frames (the number of histograms) in the C metadata) individual frames of a time series including the starting frame serves as a portion to be compared.

The portion to be compared in the S metadata is changed as the following frame shifting is performed, and a degree of similarity (difference) with the C metadata is calculated individually each time the portion to be compared is changed.

Specifically, for example, a corresponding frame of the original video that was broadcast at a time slightly before the time at which the C metadata was sent to the server 2 (or the time at which the C metadata was generated, the time at which the TV video corresponding to the C metadata was photographed, or the like) is initially set as a starting frame. A set of color histograms of the M individual frames of a time series including the starting frames is initially set as a portion to be compared. The time at which the first starting frame was broadcast is determined from broadcasting time information, broadcasting region information, etc., which will be described later. Then, an initial degree of similarity (difference) between the initial portion to be compared in the S metadata and the C metadata is calculated.

Then, a frame that is temporally later than the frame that has been used as the starting frame is set as a new starting frame (frame shifting corresponding to one frame is performed). A set of color histograms of the M individual frames of a time series including the starting frame is newly set as a portion to be compared. That is, the portion to be compared is changed. A degree of similarity (difference) between the changed portion to be compared in the S metadata and the C metadata is newly calculated.

Each time the portion to be compared is changed as a result of the repeated per-frame frame shifting, a degree of similarity (difference) between the changed portion to be compared in the S metadata and the C metadata is newly calculated.

On the basis of such a plurality of degrees of similarity (differences) calculated through the repeated per-frame frame shifting, it is determined whether to permit or deny check-in. For example, the user's check-in (authenticity) is accepted in the case where the highest degree of similarity among the plurality of degrees of similarity (differences) is greater than or equal to a certain value (the least difference is less than or equal to a certain value). In other words, the user's check-in (authenticity) is accepted in the case where a portion to be compared that is the same as or that has a degree of similarity greater than or equal to a certain value (a difference less than or equal to a certain value) to the C metadata exists among the plurality of portions to be compared, set as a result of the repeated frame shifting described above.

Specifically, in the example in FIG. 3, the generated pieces of metadata are compared with each other as if comparing the information representing the TV video C1 and the information representing the original video D with each other, whereby the check-in authentication process c in FIG. 1 is executed.

In contrast, since image data has a large amount of information, the network bandwidth would be squeezed if image data were directly sent to the server 2, which would drastically compromise scalability.

Specifically, for example, in the case where a reference color list consisting of 120 colors is used and 5-second metadata is generated by analyzing three frames per second, the size of metadata that is sent for a single check-in is obtained by multiplying 4 bytes (floating point), by 3 frames, by 5 seconds, which amounts to about 7 kilobytes.

In contrast, in the case where 3 frames are analyzed per second and image information for 5 seconds is sent directly, even if a compression algorithm such as JPEG (Joint Photographic Experts Group) is used, the information amounts to about 3000 kilobytes. Thus, the size of the image information is at least 400-times greater compared with the case where metadata is generated. Since this amount of information squeezes the direct network bandwidth, scalability is drastically compromised.

Moreover, in the case where the server 2 directly receives the image information, the server 2 has to additionally perform metadata analysis, which results in an extreme increase in the CPU load in the server 2.

As described above, if image information is directly sent to the server 2, it is not possible to realize a level of scalability that allows simultaneous check-in by a large number of viewers.

Thus, in this embodiment, image information is converted into C metadata having a smaller amount of information, specifically, a time-series color histogram matrix M (the time-series color histogram matrix CMD in the example in FIG. 1), which is sent from the user terminal 1 to the server 2. Then, the C metadata is compared with portions to be compared in the S metadata in the form of a time-series color histogram matrix M (the time-series color histogram matrix SMD in the example in FIG. 1) created from the original video, whereby check-in authentication is executed.

In this manner, the amount of information to be processed on the server 2 side is drastically reduced, which makes it possible to realize a level of scalability that allows simultaneous check-in by a large number of viewers.

Furthermore, a reference color list that is necessary in order to create such a time-series color histogram matrix M (metadata) is sent from the server 2 to the user terminal 1 during a certain period during or before the broadcasting of a TV program or the like (content) requiring check-in.

Therefore, it is substantially impossible for a third party to reproduce the reference color list and to falsify the C metadata. That is, it is possible to prevent illegitimate check-in.

Figure 4:
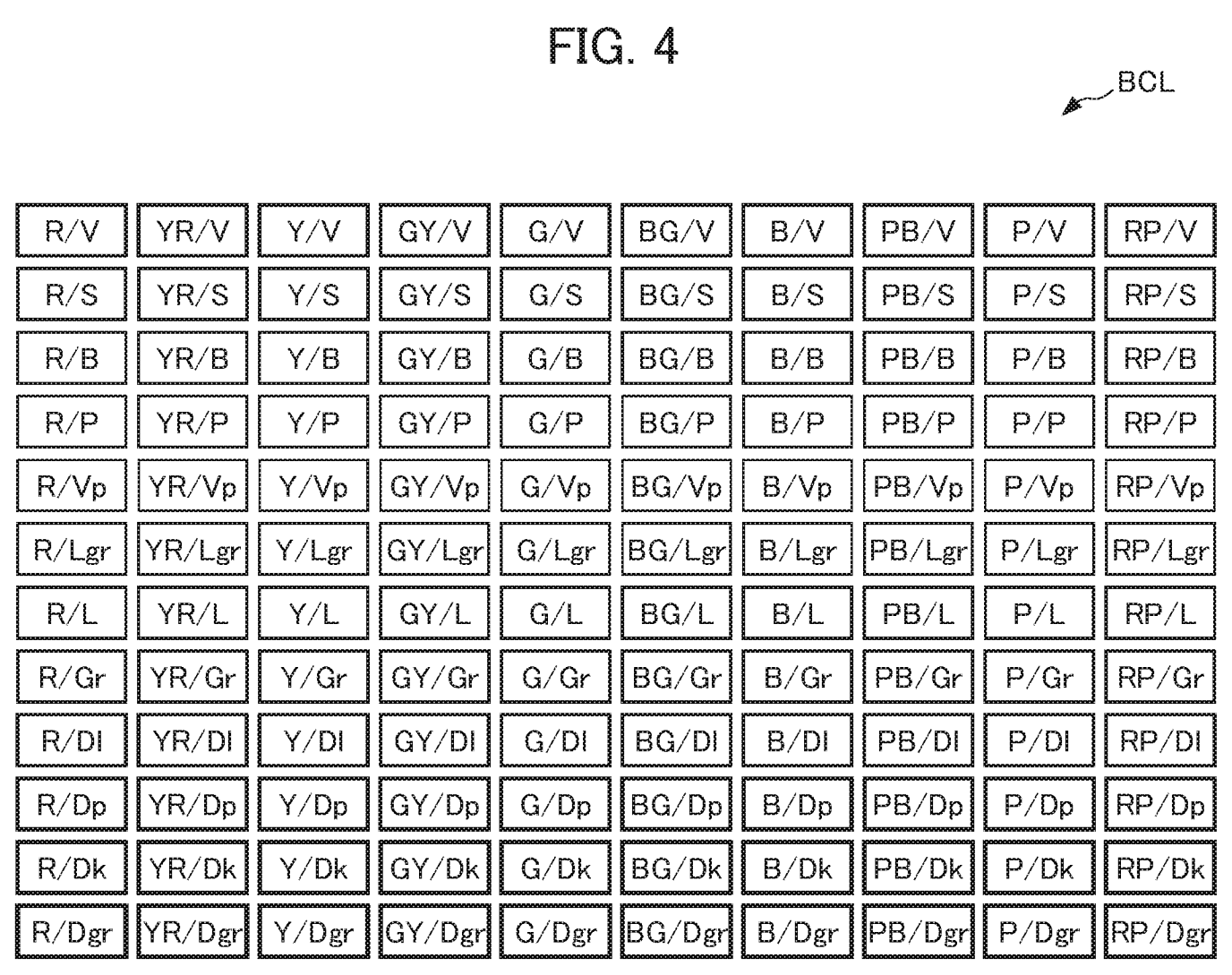

FIG. 4 is an illustration showing an example of reference colors for creating a reference color list that is adopted in the information processing system according to the embodiment of the present invention.

Referring to FIG. 4, for example, 10 colors, namely, R/V, YR/V, Y/V, . . . , are disposed in the top row. These individually represent the hues of the individual reference colors. For example, R/V indicates that the hue is red and the color tone is vivid.

Here, the color tone refers to the balance between brightness and saturation, and for example, the color tone is classified into 12 levels. That is, in the example in FIG. 4, a total of 120 kinds of color resulting from the multiplication of 10 kinds of hue and 12 kinds of tone are adopted as reference colors and are included in a list.

Furthermore, as described earlier, the greatest feature of the check-in process in this embodiment is that, by distributing a reference color list that is different on a per-user or per-group basis to the user terminal 1 immediately before broadcasting or by letting the user terminal 1 download such a reference color list at the time of check-in, check-in data (C metadata) that cannot be created in advance and that cannot be shared with other users is generated on the user terminal 1 side.

Specifically, by determining a reference color list based on FIG. 4 on the server 2 side at a timing such as just before check-in, it is possible to prevent illegitimate falsification of the result of clustering on the user terminal 1 side or sending the result of clustering to another user who is not actually viewing the video to allow check-in by that user.

That is, in order to generate, on the user terminal 1 side, C metadata having a high degree of matching with a time-series color histogram matrix M (S metadata) generated on the server 2 side, it is necessary to use the same reference color list as on the server 2 side and also to input the same video as on the server 2 side, which makes it possible to realize prevention of illegitimate check-in.

In other words, by dynamically distributing a reference color list, it is possible to prevent both sharing of C metadata between users and batch generation of C metadata by way of analysis in advance.

As described above, in this embodiment, by dynamically distributing a reference color list, a scalability improvement through distributed processing and cheating prevention are realized simultaneously, which has not been possible before.

Figure 5:
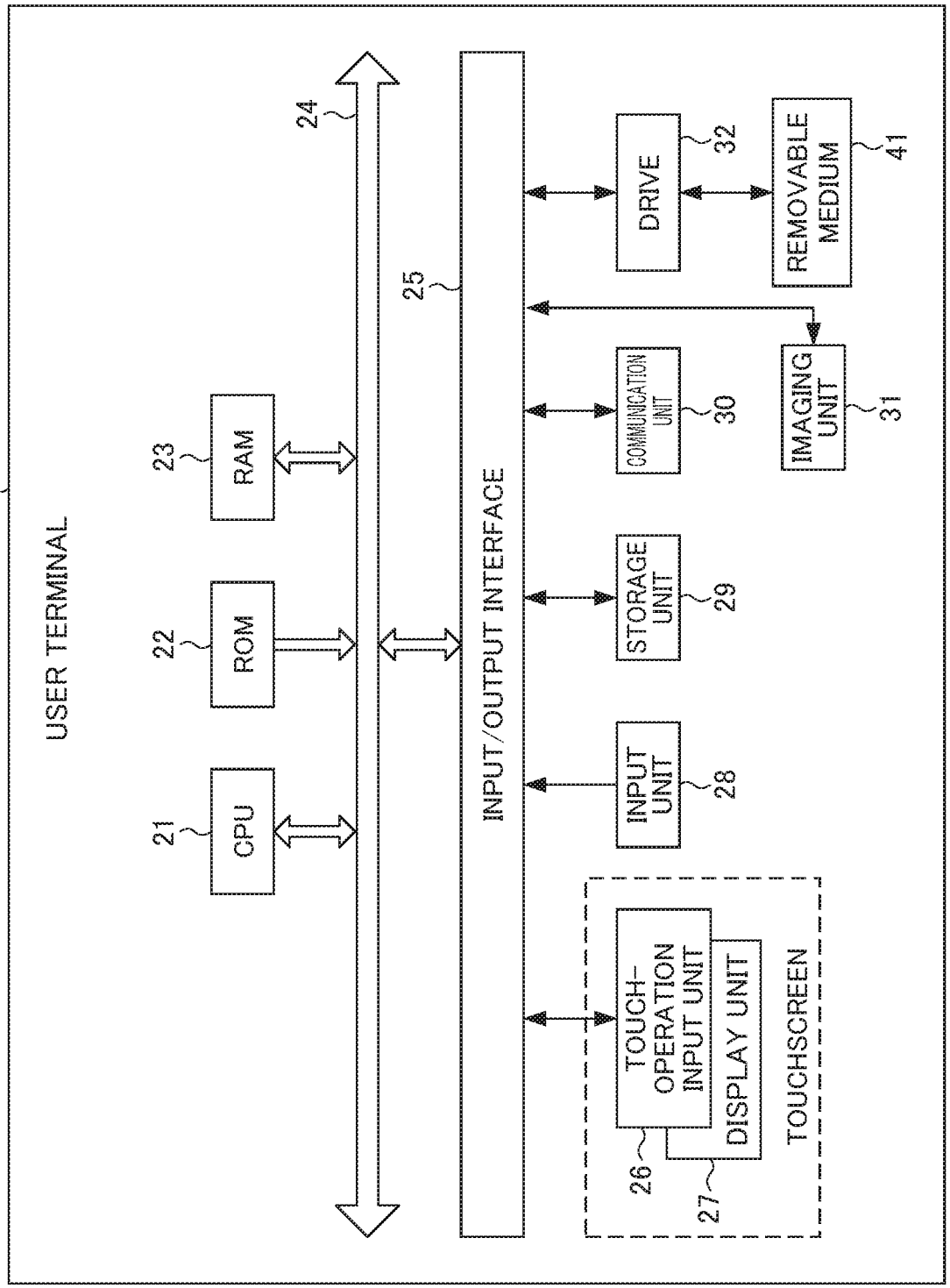
FIG. 5 is a block diagram showing an example of the hardware configuration of a user terminal according to the embodiment of the present invention.

FIG. 5 is a block diagram showing the hardware configuration of the user terminal 1 according to the embodiment of the present invention.

The user terminal 1 is implemented by a smartphone or the like.

The user terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, an imaging unit 31, and a drive 32.

The CPU 21 executes various kinds of processing according to programs recorded in the ROM 22 or programs loaded from the storage unit 29 into the RAM 23.

The RAM 23 also stores, as appropriate, information, etc. that is needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, the imaging unit 31, and the drive 32 are connected to the input/output interface 25.

The touch-operation input unit 26 is constituted of, for example, capacitive or resistive (pressure-sensitive) position input sensors that are laid over the display unit 27, which detect the coordinates of a position at which a touch operation is performed.

The display unit 27 is implemented by a display, such as a liquid crystal display, and displays various kinds of images, such as images related to a game.

As described above, in this embodiment, a touchscreen is constituted of the touch-operation input unit 26 and the display unit 27.

In this description, what is called a "display medium" does not simply refer to the display unit 27 but refers to the "touchscreen" constituted of the touch-operation input unit 26 and the display unit 27.

The input unit 28 is constituted of various kinds of hardware buttons, etc. and allows input of various kinds of information in accordance with instruction operations performed by the user.

The storage unit 29 is implemented by a hard disk, a DRAM (Dynamic Random Access Memory), or the like and stores various kinds of information.

The communication unit 30 controls communications carried out with other devices (a server (not shown) and other user terminals (not shown)) via a network (not shown), including the Internet.

The imaging unit 31 is a camera or the like that captures an image of an object.

The drive 32 is provided as needed. A removable medium 41 implemented by a magnetic disk, an optical disk, a magneto-optical disk, a semiconductor memory, or the like is loaded in the drive 32 as appropriate. A program read from the removable medium 41 by the drive 32 is installed in the storage unit 29 as needed.

Furthermore, the removable medium 41 can also store various kinds of information stored in the storage unit 29, similarly to the storage unit 29.

Figure 6:
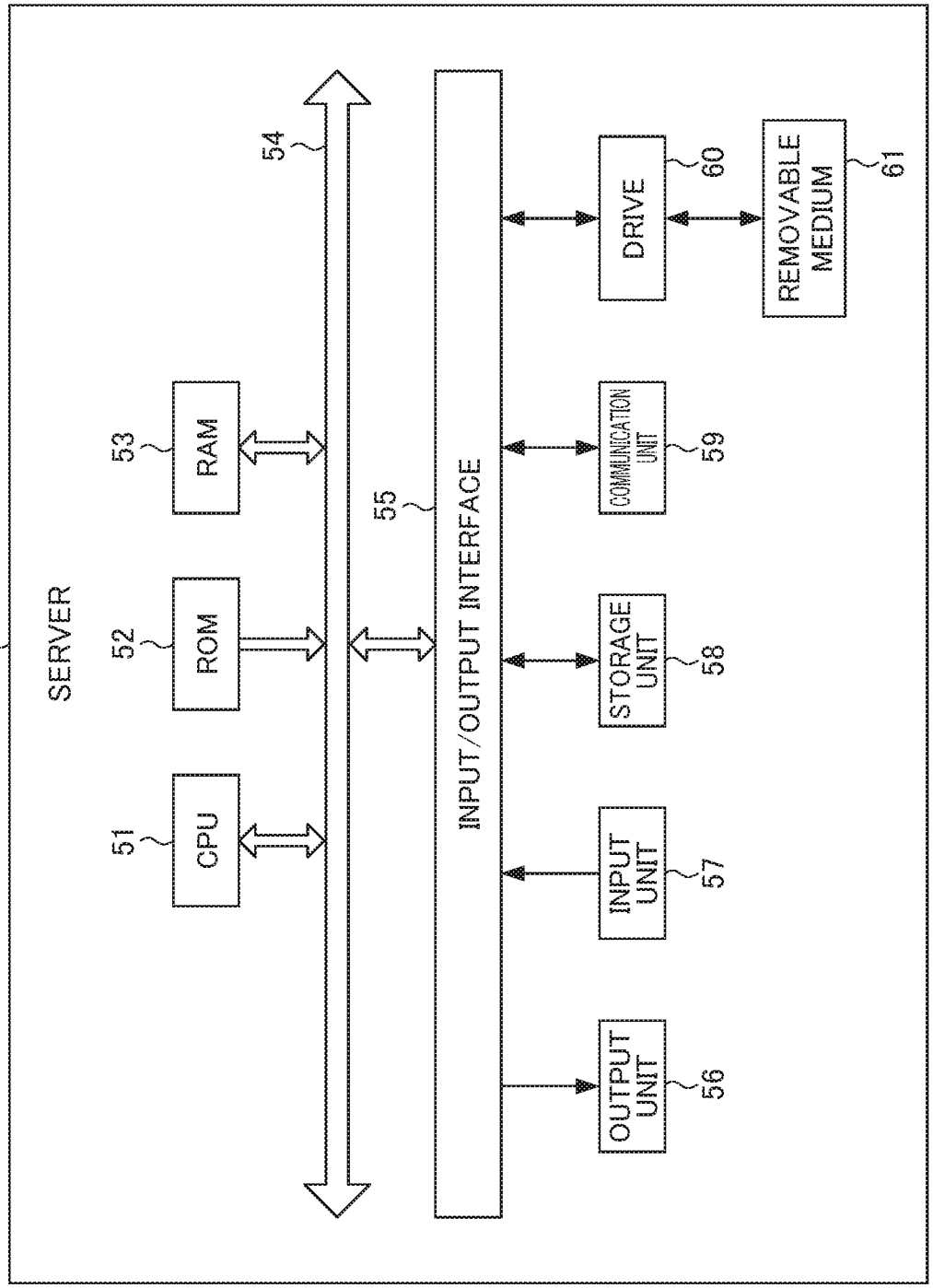
FIG. 6 is a block diagram showing an example of the hardware configuration of a server according to the embodiment of the present invention.

FIG. 6 is a block diagram showing the hardware configuration of the server 2 according to the embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60.

Since the configuration of the server 2 is basically the same as that of the user terminal 1 and the imaging unit 31 with the touchscreen thereof removed, a description thereof will be omitted here. The same applies to a removable medium 61.

Through cooperation between the above-described various kinds of hardware and various kinds of software of the user terminal 1 in FIG. 5 and the server 2 in FIG. 6, it becomes possible to execute various kinds of processing on the user terminal 1 and the server 2.

Figure 7:
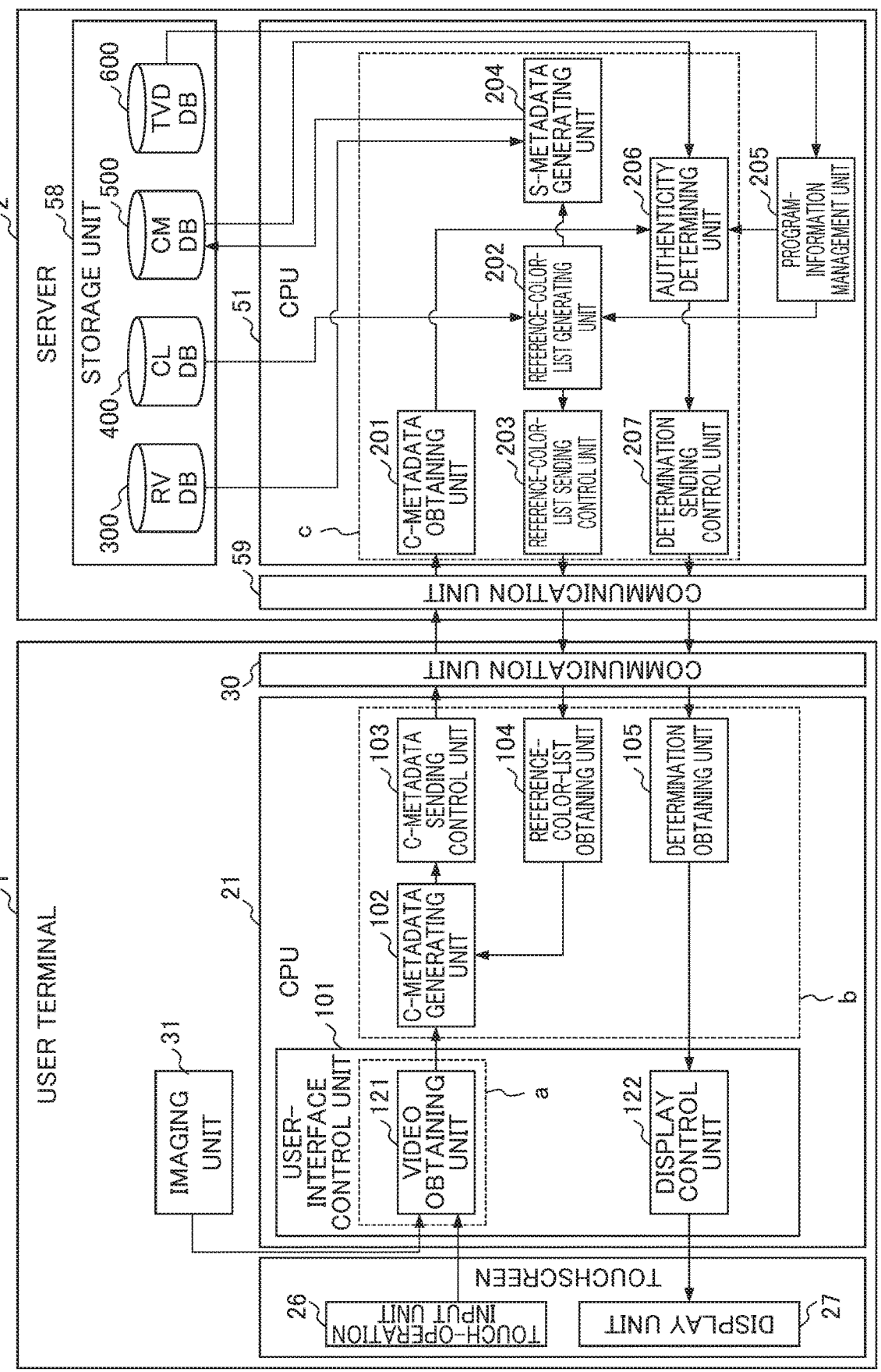
FIG. 7 is a functional block diagram showing an example of the functional configurations of the user terminal in FIG. 5 and the server in FIG. 6.

Specifically, the user terminal 1 and the server 2 have functional configurations shown in FIG. 7 in order to execute various kinds of processing.

FIG. 7 is a functional block diagram showing an example of the functional configurations of the user terminal 1 and the server 2 in FIG. 1.

As shown in FIG. 7, the CPU 21 of the user terminal 1 functions as a user-interface control unit 101, a C-metadata generating unit 102, a C-metadata sending control unit 103, a reference-color-list obtaining unit 104, and a determination obtaining unit 105.

Furthermore, the CPU 51 of the server 2 functions as a C-metadata obtaining unit 201, a reference-color-list generating unit 202, a reference-color-list sending control unit 203, an S-metadata generating unit 204, a program-information management unit 205, an authenticity determining unit 206, and a determination sending control unit 207.

Furthermore, in an area of the storage unit 58 of the server 2, an RVDB (Raw Video Data Base) 300, a CLDB (Color List Data Base) 400, a CMDB (Color Metadata Data Base) 500, and a TVPDB (TV Program Data Base) 600 are provided.

The frames represented by dotted lines in FIG. 7 indicate that the frames correspond to the processes indicated with leader lines in FIG. 7 among the process a, the process b, and the process c described earlier with reference to FIG. 1.

It is assumed that various information about various TV programs broadcasted from broadcasting stations (hereinafter collectively referred to as "program detail information"), such as information about the broadcasting times (hereinafter referred to as "broadcasting time information") and information about the broadcasting regions (hereinafter referred to as "broadcasting region information") of the various TV programs, is stored in advance in the TVPDB 600.

The program-information management unit 205 manages such program detail information, and for example, at a predetermined timing before the broadcasting time or during broadcasting of a TV program requiring check-in, the program-information management unit 205 notifies the reference-color-list generating unit 202, etc. to that effect.

The reference-color-list generating unit 202 generates a reference color list for each user or for each group to which a plurality of users belong on the basis of reference color lists stored in the CLDB 400. Here, the CLDB 400 is a database that stores a plurality of reference color lists that are currently effective. The timing of generation of the reference color list is not particularly limited as long as it is earlier than the timing of sending the reference color list to the user terminal 1, and may be just before this sending timing or a predetermined earlier timing. That is, the reference color list may be generated in advance.

The reference-color-list sending control unit 203 executes control to send the reference color list generated by the reference-color-list generating unit 202 to the user terminal 1 at the timing reported from the program-information management unit 205, i.e., a predetermined timing before the broadcasting time or during broadcasting of a TV program requiring check-in.

Furthermore, the reference color list generated by the reference-color-list generating unit 202 is also provided to the S-metadata generating unit 204 at a predetermined timing after the reference color list is generated, i.e., a predetermined timing before the broadcasting time or during broadcasting of the TV program requiring check-in (which need not necessarily coincide with the timing of sending the reference color list to the user terminal 1).

The S-metadata generating unit 204 obtains information representing the original video of the TV program requiring check-in from the RVDB 300. The S-metadata generating unit 204 subjects the individual information of each frame constituting the obtained original video to clustering by using the reference color list generated by the reference-color-list generating unit 202 for each user or group. Then, the S-metadata generating unit 204 generates a set of color histograms for the individual frames of a time series constituting the clustered video as S metadata for each user or group.

The S metadata generated in this manner is stored in the CMDB 500. In the CMDB 5000, the S metadata is stored in association with the reference color list used to generate that S metadata.

Next, the functional configuration of the user terminal 1 at the time of check-in by the user will be described.

The user-interface control unit 101 executes control of the user interface by using the touchscreen. The user-interface control unit 101 includes a video obtaining unit 121 and a display control unit 122.

When a check-in is performed, with a video of a TV program or the like requiring check-in displayed on the display screen, the user captures an image of the display screen of the TV program by operating the imaging unit 31 or the like of the user terminal 1 so as to include the display screen.

The video obtaining unit 121 obtains information representing the video thus captured by the imaging unit 31 or the like of the user terminal 1 on a per-frame basis. As described earlier, the video information here is information representing an RGB image including RGB information. The video obtaining unit 121 executes processing corresponding to the process a in FIG. 1, which is common to all users.

Here, as described earlier, among the reference color lists for individual users or individual groups, a reference color list that is applied to the user terminal 1 is sent to the user terminal 1 at a predetermined timing before the broadcasting time or during broadcasting of the TV program requiring check-in.

Thus, the reference-color-list obtaining unit 104 obtains the reference color list sent from the server 2 as described above via the communication unit 30.

The C-metadata generating unit 102 subjects the individual information of each frame constituting the video obtained by the video obtaining unit 121 to clustering by using the reference color list obtained by the reference-color-list obtaining unit 104. Then, the C-metadata generating unit 102 generates a set of color histograms of the individual frames of a time series constituting the clustered video as C metadata.

The C-metadata sending control unit 103 executes control to send the C metadata generated by the C-metadata generating unit 102 to the server 2 via the communication unit 30.

The C metadata sent from the user terminal 1 as described above is received by the server 2 and is then used at the server 2 for the determination as to whether to permit or deny check-in. Then, the result of the determination indicating permission or denial is sent from the server 2 to the user terminal 1.

Thus, the determination obtaining unit 105 obtains the determination result sent from the server 2 via the communication unit 30.

The display control unit 122 executes control to display the determination result obtained by the determination obtaining unit 105 on the display unit 27.

The functional configuration of the user terminal 1 at the time of check-in by a user has been described above. Next, the functional configuration on the server 2 side at the time when the user performs check-in as described above will be described.

As described earlier, the C-metadata obtaining unit 201 obtains the C metadata sent from the user terminal 1 via the communication unit 59.

The authenticity determining unit 206 extracts the S metadata generated by using the same reference color list used to generate the obtained C metadata from the CMDB 500. Here, what is extracted need not be the entire S metadata; an amount that allows the frame shifting (the time-series sequential shifting of the starting frame) described earlier, i.e., an amount that allows sequential comparison with the C metadata while repeating frame shifting, suffices.

Here, there are cases where the content that is broadcasted at the same time varies depending on the broadcasting period or broadcasting region even if the broadcasted program is the same. Thus, the authenticity determining unit 206 determines what is to be extracted while also taking into consideration the broadcasting time information, the broadcasting region information, etc. managed by the program-information management unit 205.

With the S metadata extracted by the CMDB 500 in this manner, the authenticity determining unit 206 sequentially sets portions to be compared so as to include starting frames while sequentially shifting the starting frame described earlier in order of time (while repeating frame shifting). Each time a portion to be compared is set, the authenticity determining unit 206 individually calculates a degree of similarity (difference) between the portion to be compared and the C metadata obtained by the C-metadata obtaining unit 201.

The authenticity determining unit 206 accepts check-in by the user (authenticity) in the case where a portion to be compared that is the same as or that has a degree of similarity greater than or equal to a certain value to the C metadata exists in the results of the repeated calculation.

Specifically, for example, in this embodiment, a degree-of-matching evaluation function is adopted for the calculation of a degree of similarity (difference) between a portion to be compared in the S metadata and the C metadata.

The degree-of-matching evaluation function in this embodiment can be defined as a function that evaluates the degree of matching between a portion to be compared in a time-series color histogram matrix M (e.g., S metadata) generated from information representing an original video and a time-series color histogram matrix Q (e.g., C metadata) generated from information representing a TV video obtained from the result of capturing an image of a display screen by the user terminal 1 and that returns the degree of matching of each frame in the form of a real number greater than or equal to 0. The formula is given in detail below.

[Eq. 5]

$$frameshifting(M, Q) = \begin{vmatrix} s_0 \\ \vdots \\ s_k \end{vmatrix} \quad (5)$$

The frameshifting(M, Q) function is a function for evaluating the individual degrees of matching between the individual portions to be compared when the individual frames of the time-series color histogram matrix M are individually considered as starting frames and the time-series color histogram matrix Q. Sm signifies scores (hereinafter referred to as "degree-of-matching scores") representing the degrees of matching between the individual portions to be compared when the individual frames of the time-series color histogram matrix M are individually considered as starting frames and the time-series color histogram matrix Q. The degree-of-matching scores Sm are real values greater than or equal to 0, preferably real values normalized in a range of 0 to 1.

That is, the authenticity determining unit 206 calculates k+1 degree-of-matching scores S0 to Sk by repeating k frame shifts. Then, the authenticity determining unit 206 determines whether to permit or deny check-in by using, for example, the degree-of-matching score that is closest to 0 among the degree-of-matching scores S0 to Sk.

The determination sending control unit 207 executes control to send, to the user terminal 1, the result of determination by the authenticity determining unit 206 as to whether to permit or deny check-in.

An example of the functional configurations of the user terminal 1 and the server 2 has been described above with reference to FIG. 7.

Next, the flow of processing executed by the user terminal 1 and the server 2 having the functional configurations in FIG. 7 will be described with reference to FIG. 8 and the subsequent figures.

Figure 8:
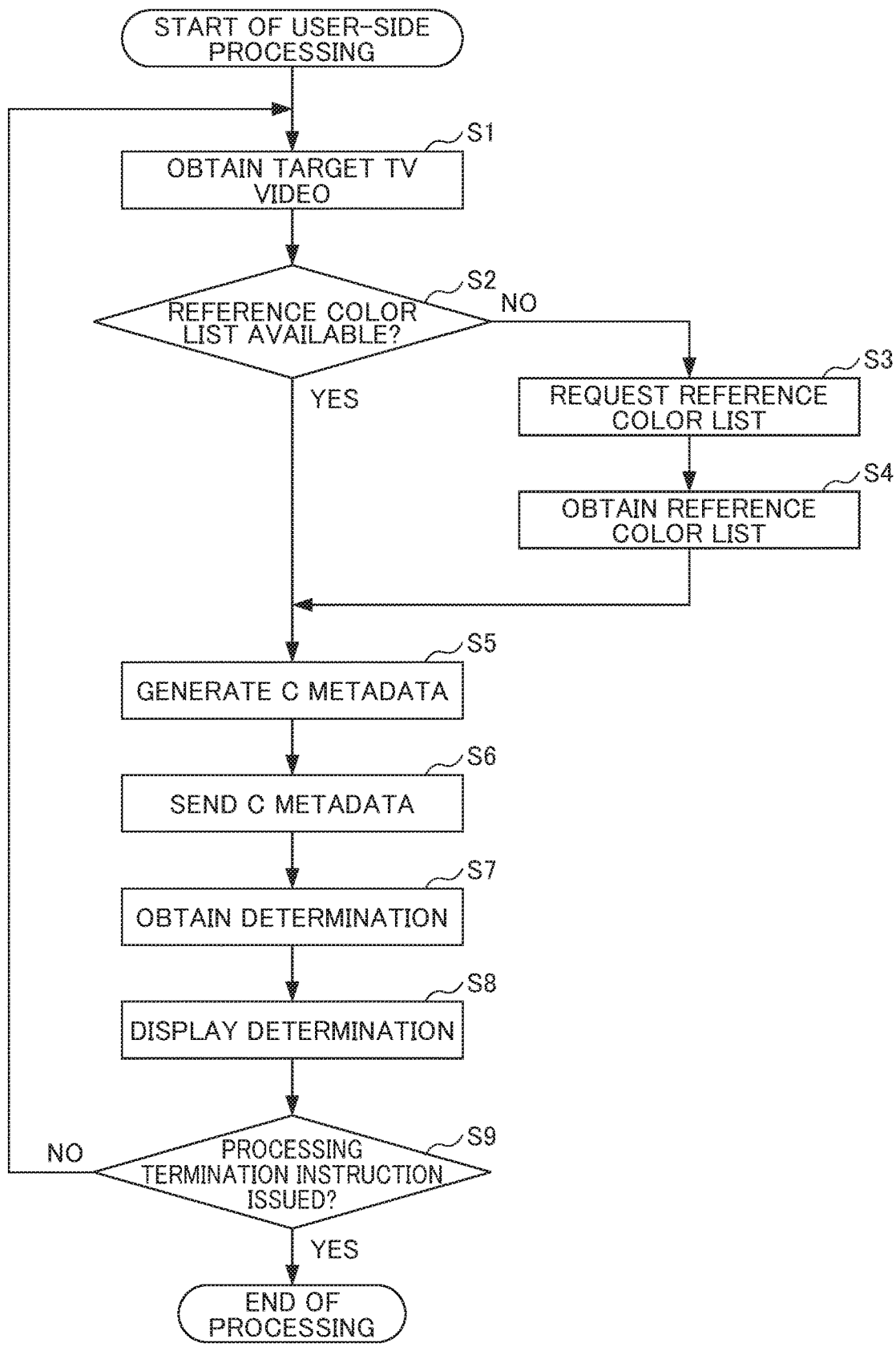
FIG. 8 is a flowchart for explaining the flow of check-in determination processing that is executed by the user terminal in FIG. 5.

FIG. 8 is a flowchart for explaining an example of the flow of processing on the user terminal 1 side.

FIGS. 9A and 9B are a flowchart for explaining an example of the flow of processing on the server 2 side.

Figure 10:
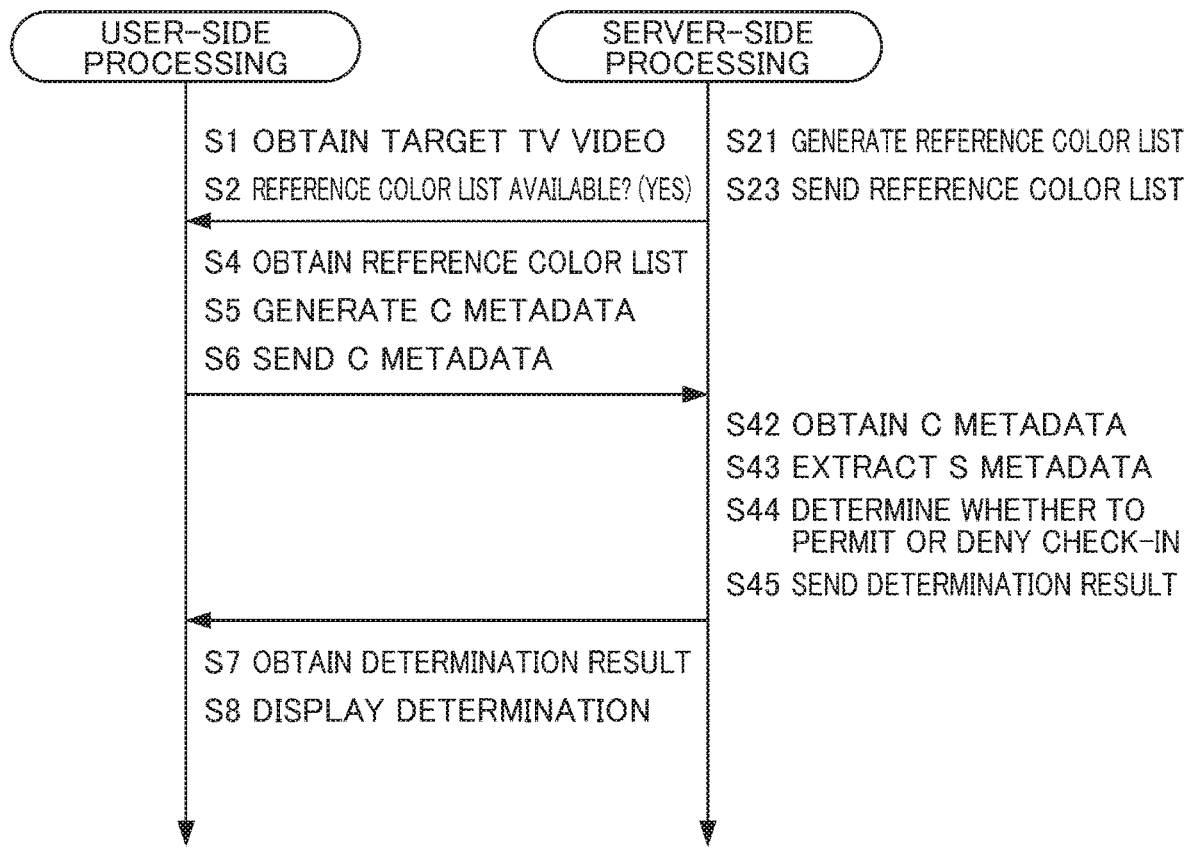
FIG. 10 is an arrow chart for explaining the flows of the check-in determination processing and the authenticity determination processing that are executed by the user terminal and the server.

Furthermore, the relationship between the processing on the user terminal 1 side and the processing on the server 2 side is shown in FIG. 10.

Specifically, FIG. 10 is an arrow chart for explaining the relationship between the processing on the user terminal 1 side and the processing on the server 2 side.

As described earlier, at the time of check-in, with a video of a TV program or the like requiring check-in displayed on the display screen, the user captures an image so as to include the display screen by using the imaging unit 31 of the user terminal 1. Then, the processing on the user terminal 1, shown in FIG. 8, is started, and the following series of processing steps are executed.

In step S1, the video obtaining unit 121 of the user-interface control unit 101 subjects the video information output from the imaging unit 31 to trimming processing or the like to obtain information representing the TV video.

In step S2, the reference-color-list obtaining unit 104 determines whether or not there is a reference color list.

In the case where a reference color list has been generated by the server 2 and has already been obtained by the user terminal 1 before the TV program or the like requiring check-in is broadcasted, the reference color list is detected by the reference-color-list obtaining unit 104, and the determination in step S2 results in YES. In this case, steps S3 and S4 are not executed, and the processing directly proceeds to step S5.

Meanwhile, in the case where a reference color list has not yet been obtained by the user terminal 1, the determination in step S2 results in NO, and the processing proceeds to step S3. Then, after executing processing in steps S3 and S4, the processing proceeds to step S5.

In step S3, the reference-color-list obtaining unit 104 requests the server 2 to send a reference color list.

Then, it is determined on the server 2 side that a sending condition is satisfied (see step S22 described later), and a reference color list is sent (see step S23 described later).

In step S4, the reference-color-list obtaining unit 104 obtains the reference color list sent from the server 2.

In step S5, the C-metadata generating unit 102 generates C metadata from the TV video information obtained in step S1 by using the reference color list detected in step S2 or obtained in step S4.

In step S6, the C-metadata sending control unit 103 sends the C metadata generated in step S5 to the server 2.

Then, the server 2 obtains the C metadata (see step S41 YES and step S42 described later) and extracts a portion of the S metadata generated by using the same reference color list used to generate the C metadata (see step S43 described later). Then, it is determined whether to permit or deny check-in by the user (authenticity) on the basis of the C metadata and the extracted portion of the S metadata (see step S44 described later), and the result of the determination is sent to the user terminal 1 (see step S45 described later).

In step S7, the determination obtaining unit 105 obtains the determination result sent from the server 2 via the communication unit 30.

In step S8, the display control unit 122 of the user-interface control unit 101 displays the determination result obtained in step S7 on the display unit 27.

In step S9, the CPU 21 of the user terminal 1 determines whether or not a processing termination instruction has been issued. Here, although the processing termination instruction is not particularly limited, a power supply shut-off of the user terminal 1 is adopted in this embodiment. That is, when the power supply is shut off at the user terminal 1, the determination in step S9 results in YES, and the processing at the user terminal 1 is terminated.

Meanwhile, unless the power supply is shut off at the user terminal 1, the determination in step S9 results in NO, the processing returns to step S1, and the subsequent processing is repeated.

The flow of processing on the server 2 side, associated with the processing on the user terminal 1 side, described with reference to FIG. 8, will be described with reference to FIGS. 9A and 9B.

First, processing in FIG. 9A, executed as preparatory processing before processing in FIG. 9B, which will be described later, will be described.

Although the timing of the processing in part (a) of FIGS. 9A and 9B are not particularly limited as long as the timing is before the processing in FIG. 9B, the processing should be started at a predetermined timing before or during broadcasting of a TV program or the like requiring check-in. This is because the effectiveness as an anti-cheating measure increases as the timing of generation of the reference color list becomes as close as possible to the timing of usage thereof.

In step S21, the reference-color-list generating unit 202 generates a reference color list from the CLDB 400.

In step S22, the reference-color-list sending control unit 203 determines whether or not a sending condition for the reference color list generated in step S21 is satisfied.

Here, various conditions may be adopted as the sending condition for the reference color list. It is assumed that two conditions, specifically, the arrival of a certain timing before or during broadcasting of the TV program or the like requiring check-in and the issuance of a sending request from the user terminal 1 (the execution of the processing of step S3 in FIG. 8), are adopted in this example.

In the case where it is determined that neither of the two sending conditions is satisfied, the determination in step S22 results in NO, and the processing returns to step S21.

Meanwhile, in the case where at least one of the sending conditions for the two sending conditions is satisfied, the determination in step S22 results in YES, and the processing proceeds to step S23.

In step S23, the reference-color-list sending control unit 203 sends the reference color list to the user terminal 1.

In step S24, the S-metadata generating unit 204 generates S metadata from the reference color list generated in step S21 and information representing the original video of the TV broadcasting program or the like, stored in the RVDB 300.

In step S25, the S-metadata generating unit 204 stores the S metadata generated in step S24 in the CMDB 500.

In step S26, the CPU 51 of the server 2 determines whether or not a processing termination instruction has been issued. Here, although the processing termination instruction is not particularly limited, a power supply shut-off of the server 2 is adopted in this embodiment. That is, when the power supply is shut off at the server 2, the determination in step S26 results in YES, and the processing at the server 2 is terminated.

Meanwhile, unless the power supply is shut off at the server 2, the determination in step S26 results in NO, the processing returns to step S21, and the subsequent processing is repeated.

Next, the flow of processing on the server 2 side in FIG. 9B will be described.

In step S41, the C-metadata obtaining unit 201 determines whether or not C metadata has been transmitted from the user terminal 1.

If the C-metadata obtaining unit 201 does not detect that C metadata has been transmitted, the determination in step S41 results in NO, and the processing returns to step S41.

Meanwhile, if C metadata is sent from the user terminal 1 in step S6 in FIG. 8 and this is detected by the C-metadata obtaining unit 201, the determination in step S41 results in YES, and the processing proceeds to step S42.

In step S42, the C-metadata obtaining unit 201 obtains the C metadata transmitted from the user terminal 1.

In step S43, the authenticity determining unit 206 extracts, from the CMDB 500, a portion of the S metadata (see step S24 in FIG. 9A) generated by using the same reference color list used to generate the C metadata obtained in step S42.

In step S44, the authenticity determining unit 206 determines whether to permit or deny check-in on the basis of the portion of the S metadata extracted in step S43 and the C metadata obtained in step S42.

In step S45, the determination sending control unit 207 sends the determination result as to whether to permit or deny check-in to the user terminal 1.

In step S46, the CPU 51 of the server 2 determines whether or not a processing termination instruction has been issued. Here, although the processing termination instruction is not particularly limited, a power supply shut-off of the server 2 is adopted in this embodiment. That is, when the power supply is shut off at the server 2, the determination in step S46 results in YES, and the processing at the server 2 is terminated.

Meanwhile, unless the power supply is shut off at the server 2, the determination in step S46 results in NO, the processing returns to step S41, and the subsequent processing is repeated.

Lastly, a method for the user to read a TV video will be described with reference to FIG. 11.

Figure 11:
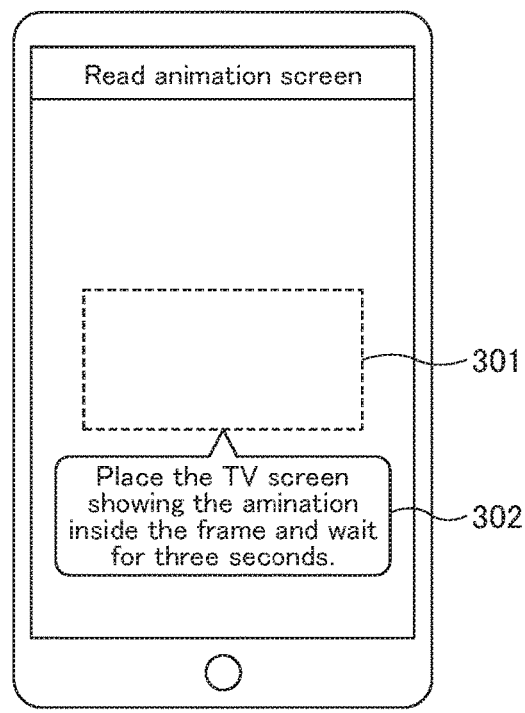
FIG. 11 is an illustration showing an example of a method for a user to capture a target TV screen.

FIG. 11 is an illustration showing an example of a method for a user to capture a target TV screen.

The state in FIG. 11 is a state in which the user has activated application software for photographing a TV video. In this state, a TV-video reading area 301 and an explanation display area 302 are provided on the display unit 27.

The user maintains the screen of the target TV program at the center of the TV-video reading area 301 and photographs the TV video, and then the check-in process described earlier is started.

Here, a message saying "place the TV screen showing the animation inside the frame and wait for three seconds" is displayed in the explanation display area 302. That is, the explanation display area 302 displays a message showing an explanation or the like for helping the user smoothly photograph the TV video.

Although the operation method for photographing the TV video may be any method, for example, the operation method may be such that photographing is possible in the case where a touch operation is performed at a portion of the display unit 27. Alternatively, although not shown, a photographing button may be provided separately on the display unit.

Although an embodiment of the present invention has been described above, it is to be noted that the present invention is not limited to the above-described embodiment and that modifications, improvements, etc. within a scope in which the object of the present invention can be achieved are encompassed in the present invention.

For example, although a reference color list is generated on the server 2 side in the above-described embodiment, it is not necessary that a reference color list be generated only on either the server 2 side or the user terminal 1 side.

For example, it is possible to enable generation of reference color lists by adopting a configuration in which the user terminals 1 own a fixed set of predetermined kinds of color defined in advance and in which the server 2 sends order information of reference color lists generated such that the sequences of reference colors vary among the individual user terminals 1 or among the individual groups to the user terminals 1.

Note that the term "generation of a reference color list" here refers to a series of processing steps of selecting N (N is an integer greater than or equal to 2 and less than a predetermined number) colors as reference colors from among the predetermined number of colors prepared in advance and determining a sequence of the N reference colors, as described earlier.

For example, although it is described that the number of reference colors is N in the above-described embodiment, the number N here is a concept encompassing the concept of N kinds.

Furthermore, although N kinds of color that are all mutually different are used as reference colors in the above-described embodiment, the same color may be included in the sequence of a reference color list. That is, the case where the number of kinds of color is less than what is referred to as N here is encompassed in the technical scope of the present invention.

Furthermore, the degree-of-matching evaluation function used in the embodiment described above does not depend on any specific degree-of-matching evaluation function, and an arbitrary degree-of-matching function may be adopted. For example, it is conceivable to adopt the following degree-of-matching evaluation function. The formula is given below in detail.

[Eq. 6]

$$frameshifting(M, Q) = \left| \begin{array}{c} \frac{\sqrt{\sum_{i=0}^{n} \left( \frac{\sum_{j=0}^{m} |M_{(0+i,j)} - Q_{[i,j]}|}{2} \right)^2}}{\sqrt{n}} \\ \vdots \\ \frac{\sqrt{\sum_{i=0}^{n} \left( \frac{\sum_{j=0}^{m} |M_{(k+i,j)} - Q_{[i,j]}|}{2} \right)^2}}{\sqrt{n}} \end{array} \right| \quad (6)$$

Here, n signifies the size of the time-series color histogram matrix Q along the time axis, and m corresponds to the number of reference color. k corresponds to the number of frames in which the starting frame is shifted along the time axis.

As another example, as an arbitrary function for computing non-similarity between histograms, the following equation may be adopted instead of the histogram difference. The formula is given below in detail.

[Eq. 7]

$$frameshifting(M, Q) = \left| \begin{array}{c} \sqrt{\sum_{i=0}^{n} dist(M_{0+i}, Q_i)^2} \\ \vdots \\ \sqrt{\sum_{i=0}^{n} dist(M_k, Q_i)^2} \end{array} \right| \quad (7)$$

Here, Mi signifies a histogram corresponding to the i-th frame of the original image, Qi signifies a histogram corresponding to the i-th query video (TV video or the like), and a distance function dist is an arbitrary function for computing the distance between these histograms in the form of a real value in a range of 0 to 1.

By using a plurality of degrees of matching thus obtained and the current time, it is confirmed that the C-metadata transmitted from the user matches the S metadata of the original video currently being broadcasted.

Furthermore, for example, an example implementation of the present invention, which has not been described in the context of the embodiment, will be briefly described. As opposed to an ordinary application server, which mainly executes IO-bound processing, an information processing system according to the present invention executes CPU-bound processing in which the internal processing is mostly matrix calculations, and thus an increase in the calculation speed by using a cache cannot be expected.

Thus, it is preferred to apply load distribution by means of a load balancer in accordance with the peaks of check-ins while allowing direct accesses from the user terminals 1 of clients to the server 2 for check-in.

Furthermore, since congestion in database traffic occurs when storing the check-in results in a database, it is desired to periodically update the check-in results. This suppresses the occurrence of DB congestion even if, for example, 500,000 users check in simultaneously.

Furthermore, the information processing system according to the present invention can be implemented in the form of two independent APIs, one of which is an API for querying the server 2 for a reference color list for clustering, and the other of which is an API for actually accepting check-ins. The user terminal 1 calls the reference color list API, which is the first API, to receive a reference color list, and analyzes a video obtained from a camera by using the reference color list. Then, the user terminal 1 sends the result of analysis to the check-in API, which is the second API, whereby the check-in processing is completed.

Furthermore, for example, the series of processing steps described above may be executed either by hardware or by software.

That is, the functional configuration in FIG. 7 is only an example, and there is no particular limitation to this example.

That is, it suffices that the information processing system be provided with functions that enable the execution of the above-described series of processing steps as a whole, and the choice of functional blocks for implementing the functions is not particularly limited to the example in FIG. 7. Furthermore, the locations of the functional blocks are not particularly limited to those in FIG. 7 and may be arbitrarily set.

Furthermore, each functional block may be implemented by hardware alone, by software alone, or by a combination of hardware and software.

Furthermore, for example, in the case where the series of processing steps are executed by software, a program constituting the software is installed on a computer, etc. via a network or from a recording medium.

The computer may be a computer embedded in special hardware.

Alternatively, the computer may be a computer that can execute various functions when various programs are installed thereon, such as a server or a general-purpose smartphone or personal computer.

Furthermore, for example, a recording medium including such a program is implemented by a removable medium (not shown) that is distributed separately from the main unit of a device in order to provide the program to a user, a recording medium that is provided to a user in a form embedded in the main unit of the device, etc.

In this description, steps dictated in the program recorded on the recording medium may include not only processing that is executed sequentially in order of time but also processing that is not executed sequentially in order of time but is executed in parallel or individually.

Furthermore, in this description, the term "system" should be construed to mean an overall apparatus constituted of a plurality of devices, a plurality of means, etc.

In other words, an information processing system according to the present invention may be embodied in various forms configured as follows.

Specifically, it suffices for an information processing system according to the present invention to be:

an information processing system constituted of clients (e.g., the user terminal 1 in FIG. 1) and a server (e.g., the server 2 in FIG. 1), wherein the clients each include:
a video obtaining means (e.g., the video obtaining unit 121 in FIG. 7) that obtains video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;

a reference-color-list obtaining means (e.g., the reference-color-list obtaining unit 104 in FIG. 7) that obtains a reference color list represented by a sequence of N (N is an integer greater than or equal to 2) reference colors on the basis of transmitted information transmitted from the server during a certain period during broadcasting or before the start of broadcasting of the content;

a client-side metadata generating means (e.g., the C-metadata generating unit 102 in FIG. 7) that sets each of M (M is an integer greater than or equal to 2) unit images constituting the client-side video as a processing target, that classifies each pixel or each block in the processing target into one of the N reference colors on the basis of the reference color list, that generates information representing a distribution of the N reference colors for the processing target, and that generates information representing the individual distributions for the M unit images as metadata of the client-side video; and a metadata sending control means (the C-metadata sending control unit 103 in FIG. 7) that executes control to send the metadata of the client-side video to the server, and wherein the server includes:

a reference-color-list-or-the-like generating means (e.g., the reference-color-list generating unit 202 in FIG. 7) that generates, as the transmitted information, the reference color list itself in which at least either the kinds or sequence of the reference colors vary among the individual clients or among individual groups to which the clients belong, or information needed for creating the reference color list, before broadcasting or during broadcasting of the content;

a reference-color-list-or-the-like sending control means (e.g., the reference-color-list sending control unit 203 in FIG. 7) that executes control to send the transmitted information for the individual clients or for the individual groups to the clients during a certain period during broadcasting or before the start of broadcasting of the content;

a server-side metadata generating means (e.g., the S-metadata generating means 204 in FIG. 7) that sets each of the plurality of unit images constituting the video in the content as a processing target, that classifies each pixel or each block in the processing target into one of the N reference colors on the basis of the reference color lists for the individual clients or for the individual groups, that generates information representing a distribution of the N reference colors for the processing target, and that generates information representing the individual distributions for the plurality of unit images as server-side metadata; and a determining means (e.g., the authenticity determining unit 206 in FIG. 7) that compares the metadata of the client-side video with metadata for the M unit images in the server-side metadata and that determines the authenticity of the client-side video on the basis of the result of the comparison.

This makes it possible to confirm with high accuracy and at high speed that a large number of unspecified viewers are viewing a certain video by way of "check-in" operations using cameras.

Specifically, the information processing system according to the present invention can realize the following three properties: namely, scalability that allows simultaneous check-in by a large number of viewers; the ability to deal with the diversity of device types of TV sets and smartphones; and prevention of illegitimate check-in by using fake metadata for authenticity validation.

More specifically, the information processing system according to the present invention has the following advantages.

Since the size of the metadata generated by the information processing system according to the present invention is a few kilobytes, the metadata can be transmitted at high speed over a network. Furthermore, since the frameshifting color difference metrics serving as a core function for check-in authentication is a relatively fast algorithm, it is possible to perform check-in authentication in real time. The real-time properties allow a user who failed in authentication, for example, because of poor illumination or an inappropriate way of holding the smartphone, to retry check-in.

The information processing system according to the present invention is a non-invasive check-in authentication mechanism in that there is no need to embed a two-dimensional code, a characteristic image, or the like in video content. Therefore, there is no need to modify video content in order to realize check-in.

In order to generate C metadata having a high degree of matching with S metadata (time-series color histogram matrix) generated on the server side by using the dynamic reference-color changing function of the information processing system according to the present invention, it is necessary to use the same reference color list (i.e., color list for clustering) as on the server side and also to input the same video information as on the server side, which makes it extremely difficult to conduct cheating.

For example, the dynamic reference-color changing function of the information processing system according to the present invention makes it possible to set a reference color list that makes it easier to extract color features in accordance with the colors in a specific broadcasting occasion. This makes it possible to further improve the authentication accuracy.

For example, the dynamic reference-color changing function of the information processing system according to the present invention makes it possible to set a reference color list that makes it easier to extract color features in accordance with the characteristics of the camera of a specific type of smartphone. This makes it possible to further improve the authentication accuracy.

The present invention may also be an information processing device that functions as a client in an information processing system constituted of clients and a server, the information processing device including:

a video obtaining means (e.g., the video obtaining unit 121 in FIG. 7) that obtains video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;

a reference-color-list obtaining means (e.g., the reference-color-list obtaining unit 104 in FIG. 7) that obtains a reference color list represented by a sequence of N (N is an integer greater than or equal to 2) reference colors, in which at least either the kinds or sequence of the reference colors vary among the individual clients or among individual groups to which the clients belong, on the basis of transmitted information transmitted from the server during a certain period during broadcasting or before the start of broadcasting of the content;

a client-side metadata generating means (e.g., the C-metadata generating unit 102 in FIG. 7) that sets each of M (M is an integer greater than or equal to 2) unit images constituting the client-side video as a processing target, that classifies each pixel or each block in the processing target into one of the N reference colors on the basis of the reference color list, that generates information representing a distribution of the N reference colors for the processing target, and that generates information representing the individual distributions for the M unit images as metadata of the client-side video; and a metadata sending control means (e.g., the C-metadata sending control unit 103 in FIG. 7) that executes control to send the metadata of the client-side video to the server as information that is used to determine the authenticity of the client-side video.

This makes it possible to confirm with high accuracy and at high speed that a large number of unspecified viewers are viewing a certain video by way of "check-in" operations using cameras.

That is, with the "check-in" operations using cameras, it is possible to realize the advantages of the invention: namely, scalability that allows simultaneous check-in by a large number of viewers, the ability to deal with the diversity of the types of TV sets, smartphones, etc., and prevention of illegitimate check-in by using fake metadata for authenticity validation.

Furthermore, the server may generate server-side metadata from the video of the content on the basis of the same reference color list as for the metadata of the client-side video, and compare the server-side metadata with the metadata of the client-side video to determine the authenticity of the client-side video, and the metadata of the client side video and metadata for the M unit images in the server-side metadata may be matrices in which the elements of either each row or each column are M temporally successive unit images and in which the elements of the other of each row and each column are the N reference colors.

Accordingly, the client-side metadata (e.g., the C metadata in FIG. 7) and the server-side metadata (e.g., the S metadata in FIG. 7) can be represented by matrices in the same format and having rows or columns including the same reference colors obtained on the basis of the same reference color list as elements and columns or rows having M unit images as elements. Since the identity of the client (e.g., the user terminal 1 in FIG. 1) is the condition for check-in, it becomes difficult to falsify client-side metadata, which makes it possible to execute more accurate "check-in" operations. Furthermore, by using representations in the forms of matrices in the same format, it becomes possible to perform check-in quickly in the form of high-speed processing in which calculations are performed to compare histograms of individual time-series unit images.

Furthermore, the video obtaining means may further include an extracting means (e.g., a function of the video obtaining unit 121 in FIG. 7) that individually extracts, from the information representing the client-side video, information corresponding to the display face displaying the content in the individual information representing the M unit images, and the client-side metadata generating means may use the information individually extracted by the extracting means as the processing target.

This makes it possible to remove information other than information representing the display face from the information representing the client-side video, thereby extracting information representing the content video (TV video or the like) displayed on the display face, which makes it possible to perform more accurate "check-in" operations.

Furthermore, the present invention may be an information processing device that functions as a server in an information processing system constituted of clients and the server,
wherein, in the case where, at the client,
video information is obtained as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device (e.g., the video obtaining unit 121 in FIG. 7), a reference color list represented by a sequence of N (N is an integer greater than or equal to 2) reference colors is obtained on the basis of transmitted information transmitted from the server during a certain period during broadcasting or before the start of broadcasting of the content (e.g., the reference-color-list obtaining unit 104 in FIG. 7), each of M (M is an integer greater than or equal to 2) unit images constituting the client-side video is set as a processing target, each pixel or each block in the processing target is classified into one of the N reference colors on the basis of the reference color list, information representing a distribution of the N reference colors for the processing target is generated, and information representing the individual distributions for the M unit images is generated as metadata of the client-side video (e.g., the C-metadata generating unit 102 in FIG. 7), and the metadata of the client-side video is sent to the server, the information processing device including:

- a reference-color-list-or-the-like generating means (e.g., the reference-color-list generating unit 202 in FIG. 7) that generates, as the transmitted information, the reference color list itself in which at least either the kinds or sequence of the reference colors vary among the individual clients or among individual groups to which the clients belong, or information needed for creating the reference color list, before broadcasting or during broadcasting of the content;
- a reference-color-list-or-the-like sending control means (e.g., the reference-color-list sending control unit 203 in FIG. 7) that executes control to send the transmitted information for the individual clients or for the individual groups to the clients during a certain period during broadcasting or before the start of broadcasting of the content;
- a server-side metadata generating means (e.g., the S-metadata generating unit 204 in FIG. 7) that sets each of the plurality of unit images constituting the video in the content as a processing target, that classifies each pixel or each block in the processing target into one of the N reference colors on the basis of the reference color lists for the individual clients or for the individual groups, that generates information representing a distribution of the N reference colors for the processing target, and that generates information representing the individual distributions for the plurality of unit images as server-side metadata; and
- a determining means (e.g., the authenticity determining unit 206 in FIG. 7) that compares the metadata of the client-side video with metadata for the M unit images in the server-side metadata and that determines the authenticity of the client-side video on the basis of the result of the comparison.

This makes it possible to confirm with high accuracy and at high speed that a large number of unspecified viewers are viewing a certain video by way of "check-in" operations using cameras.

Accordingly, with the "check-in" operations using cameras, it becomes possible to realize the advantages of the invention: namely, scalability that allows simultaneous check-in by a large number of viewers, the ability to deal with the diversity of the types of TV sets, smartphones, etc., and prevention of illegitimate check-in by using fake metadata for authenticity validation.

Furthermore, the metadata of the client side video and metadata for the M unit images in the server-side metadata may be matrices in which the elements of either each row or each column are M temporally successive unit images and in which the elements of the other of each row and each column are the N reference colors.

Accordingly, the client-side metadata (e.g., the C metadata in FIG. 7) and the server-side metadata (e.g., the S metadata in FIG. 7) can be represented by matrices in the same format and having rows or columns including the same reference colors obtained on the basis of the same reference color list as elements and columns or rows having M unit images as elements. Since the identity of the client (e.g., the user terminal 1 in FIG. 1) is the condition for check-in, it becomes difficult to falsify client-side metadata, which makes it possible to execute more accurate "check-in" operations. Furthermore, by using representations in the form of matrices in the same format, it becomes possible to perform check-in quickly in the form of high-speed processing in which calculations are performed to compare histograms of individual time-series unit images.

Furthermore, the determining means may start processing by using, as a starting image, a unit image that is a predetermined time before the time of obtaining the metadata of the client-side video in the server-side metadata, repeatedly execute processing for comparing metadata for M unit images that are temporally successive from the starting image with the metadata of the client-side video, while shifting the unit image serving as the starting image one by one, and determine the authenticity of the client-side video on the basis of the results of the execution.

This makes it possible to accurately perform "check-in" operations also with temporally successive images, which makes it possible to perform more accurate "check-in" operations.

Furthermore, the reference-color-list-or-the-like sending control means may associate the reference color lists for the individual clients or for the individual groups with IDs of users who operate the clients or IDs of groups to which the users belong, and execute control to send the reference color lists for the individual clients or for the individual groups to the clients as the transmitted information during a certain period during broadcasting or before the start of broadcasting of the content.

This makes it possible to use different reference color lists for individual users or individual groups, which makes it possible to effectively prevent "check-in" operations using illegitimate means.

Furthermore, the information processing device may include a first management means that manages a broadcasting time of the content, and, on the basis of a result of determination by the first management means, the reference-color-list-or-the-like generating means may generate the transmitted information, and the reference-color-list-or-the-like sending control means may execute control to send the transmitted information.

This makes it possible to perform "check-in" operations accurately reflecting the broadcasting times of content, which makes it possible to perform more accurate "check-in" operations.

Furthermore, the information processing device may include a second management means that manages a broadcasting region of the content, and, on the basis of a result of determination by the second management means, the reference-color-list-or-the-like generating means may generate the transmitted information, and the reference-color-list-or-the-like sending control means may execute control to send the transmitted information.

This makes it possible to perform "check-in" operations accurately reflecting differences among the broadcasting regions of content, which makes it possible to perform more accurate "check-in" operations.

EXPLANATION OF REFERENCE NUMERALS

1 User terminal
2 Server
21 CPU
27 Display unit
51 CPU
101 User-interface control unit
102 C-metadata generating unit
103 C-metadata sending control unit
104 Reference-color-list obtaining unit
105 Determination obtaining unit
121 Video obtaining unit 122 Display control unit
201 C-metadata obtaining unit
202 Reference-color-list generating unit
203 Reference-color-list sending control unit
204 S-metadata generating unit
205 Program-information management unit
206 Authenticity determining unit
207 Determination sending control unit
300 RVDB
400 CLDB
500 CMDB
600 TVPDB

The invention claimed is:

1. An information processing system constituted of a plurality of clients and a server, wherein each client of the plurality of clients comprise:
a user terminal comprising a display screen, a first central processing unit, and a first memory, wherein the user terminal is configured to:
obtain video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;
obtain a reference color list represented by a sequence of N (N is an integer greater than or equal to 2) reference colors based on transmitted information transmitted from the server during a certain period during broadcasting or before the start of broadcasting of the content;
set each of M (M is an integer greater than or equal to 2) unit images constituting the client-side video as a processing target, that classifies each pixel or each block in the processing target into one of the N reference colors based on the reference color list, that generates information representing a distribution of the N reference colors for the processing target, and that generates information representing individual distributions for the M unit images as metadata of the client-side video; and
execute control to send the metadata of the client-side video to the server, and
wherein the server comprises a second central processing unit and a second memory, wherein the server is configured to:
generate, as the transmitted information, the reference color list in which at least either the kinds or sequence of the reference colors vary among individual clients of the plurality of clients or among individual groups to which the plurality of clients belong, or information needed for creating the reference color list, before broadcasting or during broadcasting of the content;
execute control to send the transmitted information for the plurality of clients or for the individual groups to the plurality of clients during a certain period during broadcasting or before the start of broadcasting of the content;
sets each of the plurality of unit images constituting the video in the content as a processing target, that classifies each pixel or each block in the processing target into one of the N reference colors based on the reference color lists for the plurality of clients or for the individual groups, that generates information representing the distribution of the N reference colors for the processing target, and that generates information representing the individual distributions for the plurality of unit images as server-side metadata; and
compare the metadata of the client-side video with metadata for the M unit images in the server-side metadata and determine an authenticity of the client-side video based on the result of the comparison.

2. An information processing device that functions as a client in an information processing system constituted of a plurality of clients and a server, the information processing device comprising:
a display screen;
a central processing unit; and
a memory coupled to the central processing unit, where the memory comprises instructions that cause the central processing unit to:
obtain video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;
obtain a reference color list represented by a sequence of N (N is an integer greater than or equal to 2) reference colors, in which at least either the kinds or sequence of the reference colors vary among individual clients of the plurality of clients or among individual groups to which the plurality of clients belong, based on transmitted information transmitted from the server during a certain period during broadcasting or before the start of broadcasting of the content;
set each of M (M is an integer greater than or equal to 2) unit images constituting the client-side video as a processing target, that classifies each pixel or each block in the processing target into one of the N reference colors based on the reference color list, that generates information representing a distribution of the N reference colors for the processing target, and that generates information representing the individual distributions for the M unit images as metadata of the client-side video; and
execute control to send the metadata of the client-side video to the server as information that is used to determine an authenticity of the client-side video.

3. An information processing device according to claim 2, wherein the server generates server-side metadata from the video of the content on the basis of the same reference color list as for the metadata of the client-side video, and compares the server-side metadata with the metadata of the client-side video to determine the authenticity of the client-side video, and
wherein the metadata of the client-side video and metadata for the M unit images in the server-side metadata are matrices in which the elements of either each row or each column are M temporally successive unit images and in which the elements of the other of each row and each column are the N reference colors.

4. An information processing device according to claim 2, wherein the memory further comprises instructions that cause the central processing unit to:
individually extract, from the information representing the client-side video, information corresponding to the display face displaying the content in the individual information representing the M unit images, and use the information individually extracted as the processing target.

5. A non-transitory computer readable medium storing a program for causing a client in an information processing system constituted of clients and a server to execute control processing comprising:

a video obtaining step of obtaining video information as information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;

a reference-color-list obtaining step of obtaining a reference color list represented by a sequence of N (N is an integer greater than or equal to 2) reference colors, the reference color list being generated by the server during broadcasting or before broadcasting of the content for each of the clients or for each of groups to which the clients belong, on the basis of transmitted information transmitted from the server during a certain period during broadcasting or before the start of broadcasting of the content;

a client-side metadata generating step of setting each of M (M is an integer greater than or equal to 2) unit images constituting the client-side video as a processing target, classifying each pixel or each block in the processing target into one of the N reference colors on the basis of the reference color list, generating information representing a distribution of the N reference colors for the processing target, and generating information representing the individual distributions for the M unit images as metadata of the client-side video; and a metadata sending control step of executing control to send the metadata of the client-side video to the server as information that is used to determine the authenticity of the client-side video.

6. An information processing method that is performed by an information processing system constituted of a plurality of clients and a server, the information processing method comprising:

obtaining, at a client among the plurality of clients, video information that is information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;

obtaining a reference color list represented by a sequence of N (N is an integer greater than or equal to 2) reference colors based on transmitted information transmitted from the server during a certain period during broadcasting or before the start of broadcasting of the content, wherein each of M (M is an integer greater than or equal to 2) unit images constituting the client-side video is set as a processing target, each pixel or each block in the processing target is classified into one of the N reference colors based on the reference color list, information representing a distribution of the N reference colors for the processing target is generated, and information representing individual distributions for the M unit images is generated as metadata of the client-side video; and sending the metadata of the client-side video to the server, wherein the information processing method further comprises:

generating, as the transmitted information, the reference color list itself in which at least either the kinds or sequence of the reference colors vary among individual clients of the plurality of clients or among individual groups to which the plurality of clients belong, or information needed for creating the reference color list, before broadcasting or during broadcasting of the content;

executing control to send the transmitted information for the plurality of clients or for the individual groups to the plurality of clients during a certain period during broadcasting or before the start of broadcasting of the content;

setting each of the plurality of unit images constituting the video in the content as a processing target, that classifies each pixel or each block in the processing target into one of the N reference colors based on the reference color lists for the plurality of clients or for the individual groups, that generates information representing the distribution of the N reference colors for the processing target, and that generates information representing the individual distributions for the plurality of unit images as server-side metadata;

comparing the metadata of the client-side video with metadata for the M unit images in the server-side metadata; and determining an authenticity of the client-side video based on the result of the comparison.

7. An information processing method according to claim 6, wherein the metadata of the client-side video and metadata for the M unit images in the server-side metadata are matrices in which the elements of either each row or each column are M temporally successive unit images and in which the elements of the other of each row and each column are the N reference colors.

8. An information processing method according to claim 6, further comprising:

starting processing by using, as a starting image, a unit image that is a predetermined time before the time of obtaining the metadata of the client-side video in the server-side metadata;

repeatedly executing processing for comparing metadata for M unit images that are temporally successive from the starting image with the metadata of the client-side video, while shifting the unit image serving as the starting image one by one; and determining the authenticity of the client-side video on the basis of the based on results of the repeated execution.

9. An information processing method according to claim 6, further comprising:

associating the reference color lists for the individual clients among the plurality of the clients or for the individual groups with IDs of users who operate the clients or IDs of groups to which the users belong, and executing control to send the reference color lists for the individual clients among the plurality of clients or for the individual groups to the plurality of clients as the transmitted information during a certain period during broadcasting or before the start of broadcasting of the content.

10. An information processing method according to claim 6, further comprising:
    managing a broadcasting time of the content;
    generating, based on a result of a determination, the transmitted information; and
    executing control to send the transmitted information.

11. An information processing method according to claim 6, further comprising:
    managing a broadcasting region of the content;
    generating, based on a result of a determination, the transmitted information; and
    executing control to send the transmitted information.

12. A non-transitory computer readable medium storing a program for performing a method in an information processing system constituted of a plurality of clients and the server, the method comprising:
    obtaining, at a client among the plurality of clients, video information that is information representing a client-side video while content including a video constituted of a plurality of unit images is being broadcasted according to a predetermined time schedule and is being received and played back by a predetermined playback device, the video information being obtained as a result of capturing images of a display face displaying the video for a predetermined period by using a predetermined imaging device;
    obtaining a reference color list represented by a sequence of N (N is an integer greater than or equal to 2) reference colors based on transmitted information transmitted from the server during a certain period during broadcasting or before the start of broadcasting of the content;
    wherein each of M (M is an integer greater than or equal to 2) unit images constituting the client-side video is set as a processing target, each pixel or each block in the processing target is classified into one of the N reference colors based on the reference color list, information representing a distribution of the N reference colors for the processing target is generated, and information representing individual distributions for the M unit images is generated as metadata of the client-side video; and
    sending the metadata of the client-side video to the server, wherein the program causes the server to perform:
    a reference-color-list-or-the-like generating step of generating, as the transmitted information, the reference color list itself in which at least either the kinds or sequence of the reference colors vary among individual clients among the plurality of clients or among individual groups to which the plurality of clients belong, or information needed for creating the reference color list, before broadcasting or during broadcasting of the content;
    a reference-color-list-or-the-like sending control step of executing control to send the transmitted information for the plurality of clients or for the individual groups to the plurality of clients during a certain period during broadcasting or before the start of broadcasting of the content;
    a server-side metadata generating step of setting each of the plurality of unit images constituting the video in the content as a processing target, classifying each pixel or each block in the processing target into one of the N reference colors on the basis of the reference color lists for the plurality of clients or for the individual groups, generating information representing a distribution of the N reference colors for the processing target, and generating information representing individual distributions for the plurality of unit images as server-side metadata;
    a determining step of comparing the metadata of the client-side video with metadata for the M unit images in the server-side metadata, and
    wherein the determining step further determines an authenticity of the client-side video based on the result of the comparison.

* * * * *